(12) United States Patent
Ogawa et al.

(10) Patent No.: US 10,540,912 B2
(45) Date of Patent: Jan. 21, 2020

(54) ORGAN MODEL

(71) Applicants: SUNARROW LTD, Tokyo (JP); Toshiaki Morikawa, Tokyo (JP)

(72) Inventors: Atsushi Ogawa, Niigata (JP); Masataka Tanaka, Niigata (JP)

(73) Assignees: SUNARROW LTD, Tokyo (JP); Toshiaki Morikawa, Tokyo (JP)

( * ) Notice: Subject to any disclaimer, the term of this patent is extended or adjusted under 35 U.S.C. 154(b) by 383 days.

(21) Appl. No.: 15/313,798

(22) PCT Filed: May 26, 2015

(86) PCT No.: PCT/JP2015/064985
§ 371 (c)(1),
(2) Date: Nov. 23, 2016

(87) PCT Pub. No.: WO2015/182568
PCT Pub. Date: Dec. 3, 2015

(65) Prior Publication Data
US 2017/0186340 A1 Jun. 29, 2017

(30) Foreign Application Priority Data

May 26, 2014 (JP) ................................ 2014-108574
Dec. 16, 2014 (JP) ................................ 2014-253884

(51) Int. Cl.
*G09B 23/28* (2006.01)
*G09B 23/30* (2006.01)
(Continued)

(52) U.S. Cl.
CPC ................ *G09B 23/30* (2013.01); *B32B 1/08* (2013.01); *B32B 5/022* (2013.01); *B32B 5/024* (2013.01);
(Continued)

(58) Field of Classification Search
USPC ................................. 434/262, 267, 268, 272
See application file for complete search history.

(56) References Cited

U.S. PATENT DOCUMENTS 4,481,001 A * 11/1984 Graham ............... G09B 23/285
434/267
4,596,528 A * 6/1986 Lewis .................... G09B 23/30
434/270
(Continued)

FOREIGN PATENT DOCUMENTS

JP 2007-316434 A 12/2007
JP 2008-197483 A 8/2008
(Continued)

OTHER PUBLICATIONS

International Preliminary Report issued in International Application No. PCT/JP2015/064985; dated Dec. 8, 2016, (6 pages).
(Continued)

*Primary Examiner* — Kurt Fernstrom
(74) *Attorney, Agent, or Firm* — Osha Liang LLP

(57) ABSTRACT

Provided is an organ model having a property such that each layer suitably peels off, a property such that sliding or a sense of catching is present besides a sense of elasticity that is felt when a surgical knife cuts the organ model open, and a property such that ligation can be performed without burying of a suture thread, and a property such that a knot of the thread gets caught on the organ model. An organ model being a laminated body in which plural layers each formed of a hydrogel material are laminated, and one or more of the layers is each a fiber group-containing layer in which fiber groups are approximately continuously present inside the layer and over the plane of the layer.

26 Claims, 17 Drawing Sheets

(51) Int. Cl.
  *B32B 5/02* (2006.01)
  *B32B 5/32* (2006.01)
  *B32B 5/08* (2006.01)
  *B32B 1/08* (2006.01)
  *B32B 5/24* (2006.01)
  *B32B 7/06* (2019.01)
  *B32B 5/26* (2006.01)
  *B32B 5/20* (2006.01)
  *B32B 27/30* (2006.01)

(52) U.S. Cl.
  CPC .......... *B32B 5/08* (2013.01); *B32B 5/20* (2013.01); *B32B 5/245* (2013.01); *B32B 5/26* (2013.01); *B32B 5/32* (2013.01); *B32B 7/06* (2013.01); *B32B 27/306* (2013.01); *G09B 23/285* (2013.01); *B32B 2250/02* (2013.01); *B32B 2250/03* (2013.01); *B32B 2250/248* (2013.01); *B32B 2255/102* (2013.01); *B32B 2255/26* (2013.01); *B32B 2260/023* (2013.01); *B32B 2260/046* (2013.01); *B32B 2262/0238* (2013.01); *B32B 2262/0246* (2013.01); *B32B 2262/0253* (2013.01); *B32B 2262/0261* (2013.01); *B32B 2262/0269* (2013.01); *B32B 2262/0276* (2013.01); *B32B 2262/0292* (2013.01); *B32B 2262/04* (2013.01); *B32B 2262/062* (2013.01); *B32B 2262/065* (2013.01); *B32B 2262/08* (2013.01); *B32B 2262/101* (2013.01); *B32B 2262/103* (2013.01); *B32B 2262/106* (2013.01); *B32B 2262/14* (2013.01); *B32B 2266/122* (2016.11); *B32B 2305/18* (2013.01); *B32B 2307/402* (2013.01); *B32B 2307/4026* (2013.01); *B32B 2307/51* (2013.01); *B32B 2307/536* (2013.01); *B32B 2307/54* (2013.01); *B32B 2307/58* (2013.01); *B32B 2307/581* (2013.01); *B32B 2307/718* (2013.01); *B32B 2307/732* (2013.01); *B32B 2307/748* (2013.01); *B32B 2329/04* (2013.01); *B32B 2535/00* (2013.01)

(56) References Cited

U.S. PATENT DOCUMENTS

| | | | | |
|---|---|---|---|---|
| 8,359,118 | B2* | 1/2013 | Ono | G09B 23/30 434/272 |
| 8,801,986 | B2* | 8/2014 | Matsui | B29C 64/165 264/112 |
| 2009/0246747 | A1* | 10/2009 | Buckman, Jr. | G09B 23/285 434/272 |
| 2010/0167254 | A1* | 7/2010 | Nguyen | G09B 23/30 434/272 |
| 2012/0028231 | A1* | 2/2012 | Misawa | G09B 23/30 434/267 |
| 2012/0034587 | A1* | 2/2012 | Toly | G09B 23/285 434/267 |
| 2012/0045743 | A1 | 2/2012 | Okano et al. | |
| 2012/0282584 | A1* | 11/2012 | Millon | B29C 39/003 434/272 |
| 2012/0288839 | A1* | 11/2012 | Crabtree | B65D 75/008 434/267 |
| 2014/0017651 | A1* | 1/2014 | Sugimoto | G09B 23/30 434/272 |
| 2014/0302474 | A1* | 10/2014 | Sakezles | G09B 23/303 434/268 |
| 2015/0031008 | A1* | 1/2015 | Black | G09B 23/285 434/272 |

FOREIGN PATENT DOCUMENTS

| | | |
|---|---|---|
| JP | 2011/022522 A | 2/2011 |
| JP | 2013-015789 A | 1/2013 |

OTHER PUBLICATIONS

International Search Report issued in PCT/JP2015/064985, dated Aug. 11, 2015 (1 page).
Written Opinion of the International Searching Authority issued in PCT/JP2015/064985, dated Aug. 11, 2015 (3 pages).

* cited by examiner

[FIG. 1]
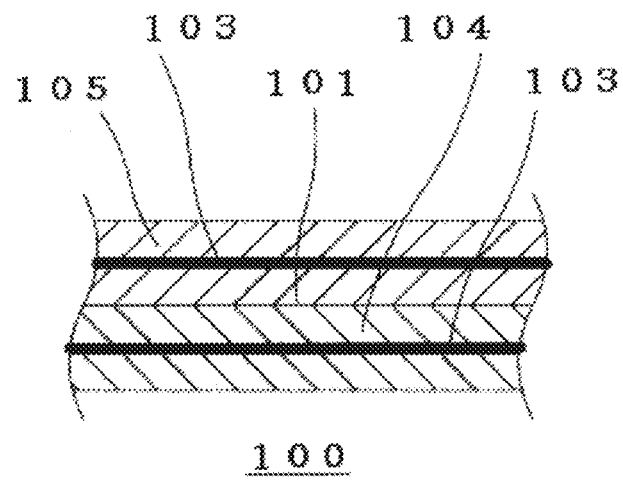
[FIG. 2]
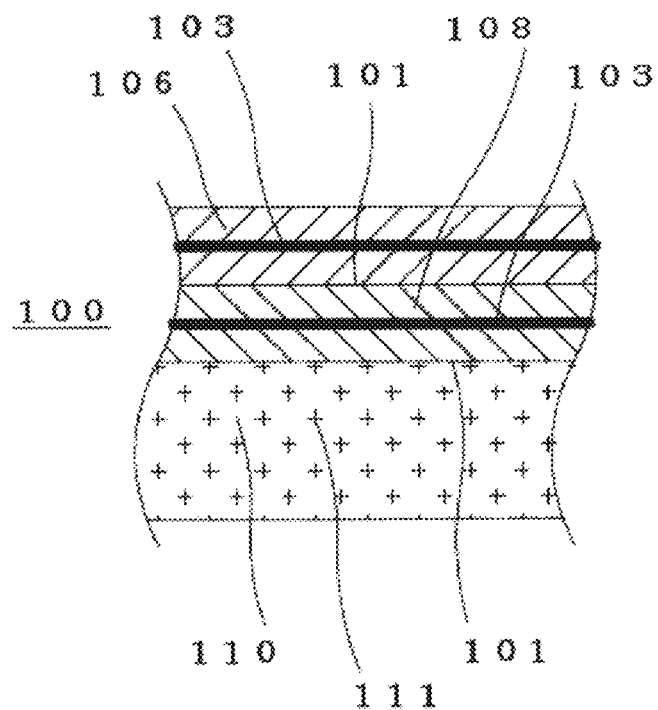

[FIG. 3]
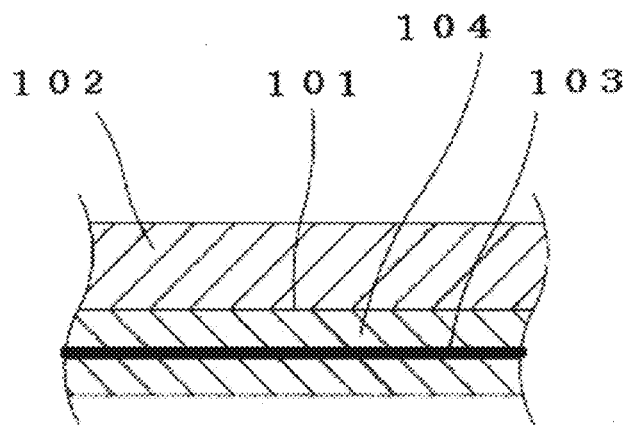
[FIG. 4A]
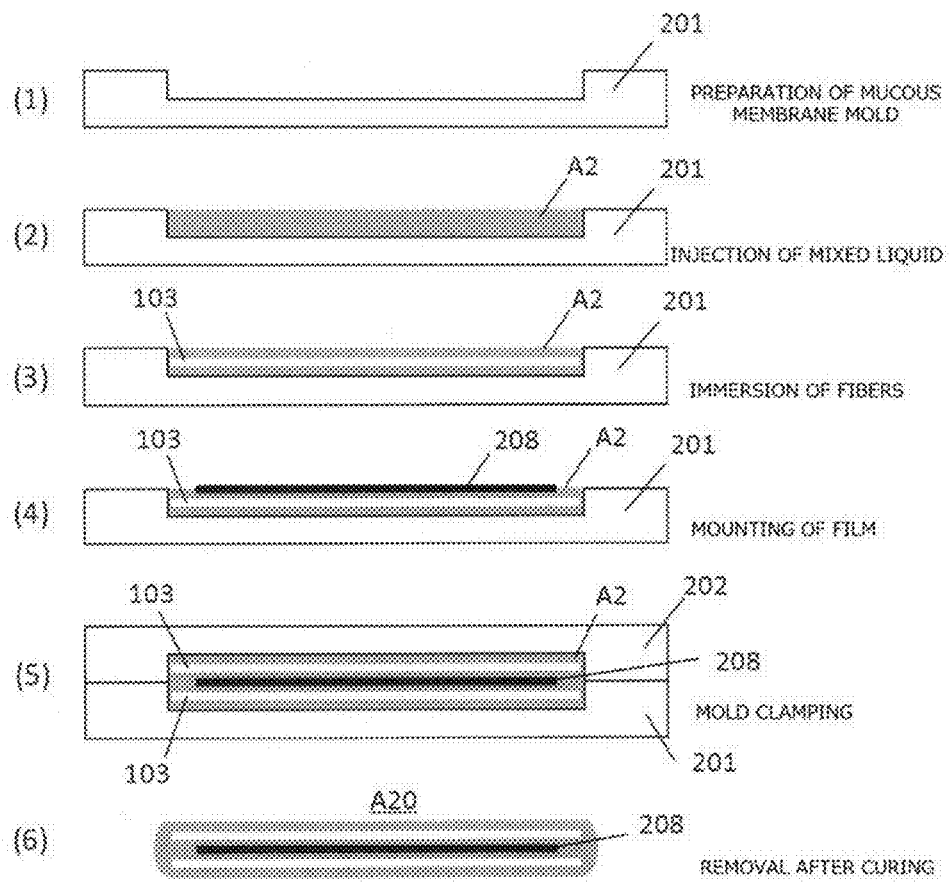

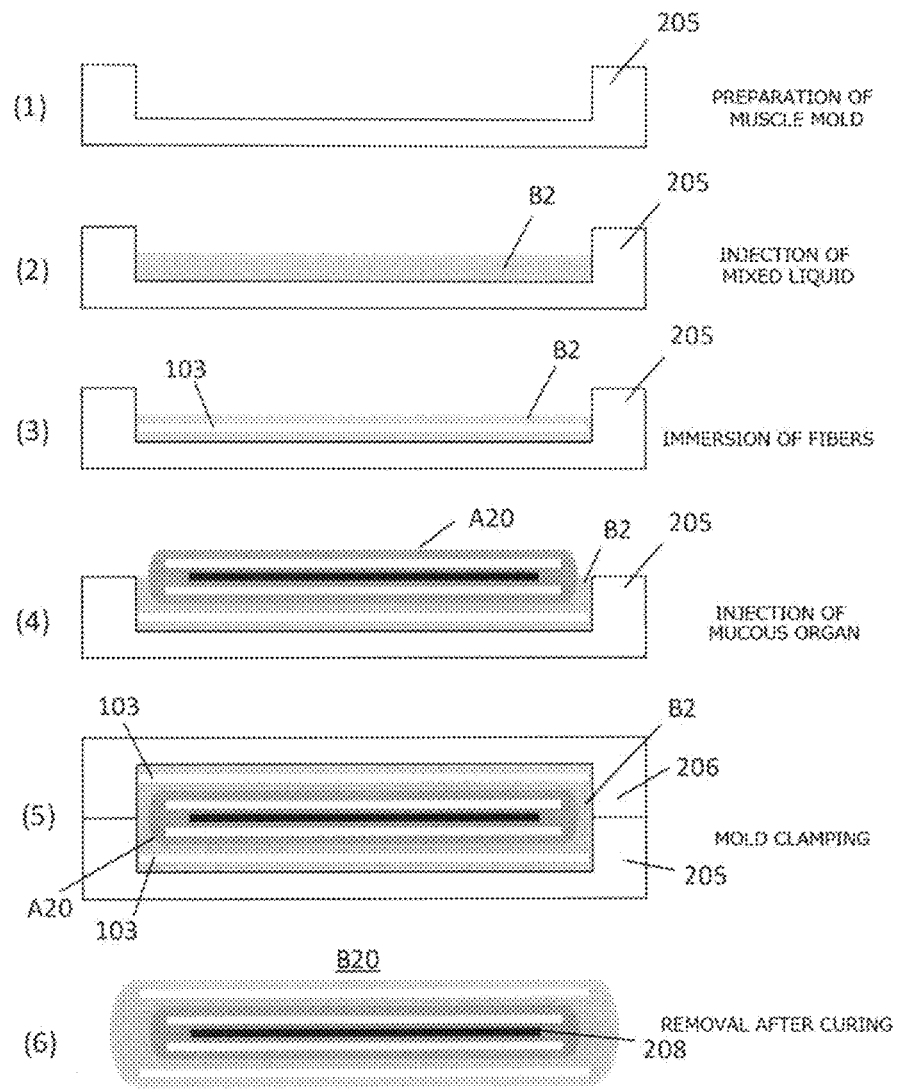

[FIG. 5]
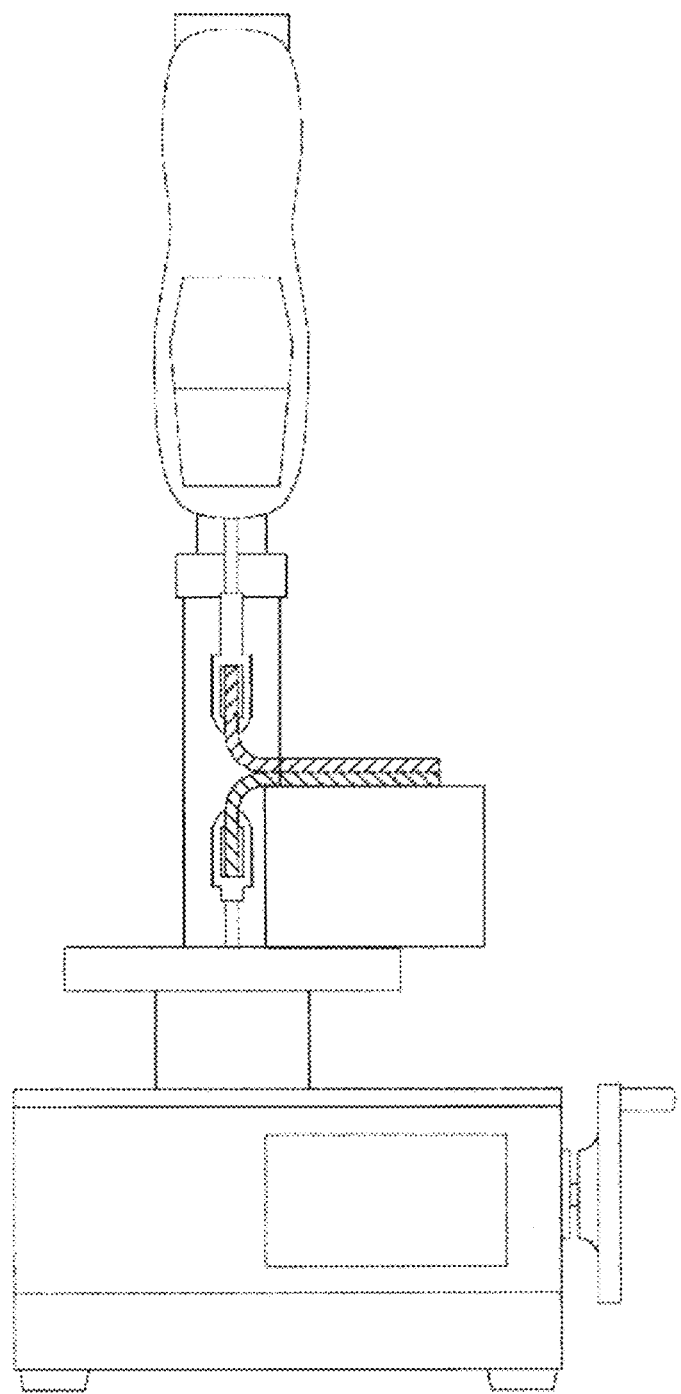

[FIG. 6]
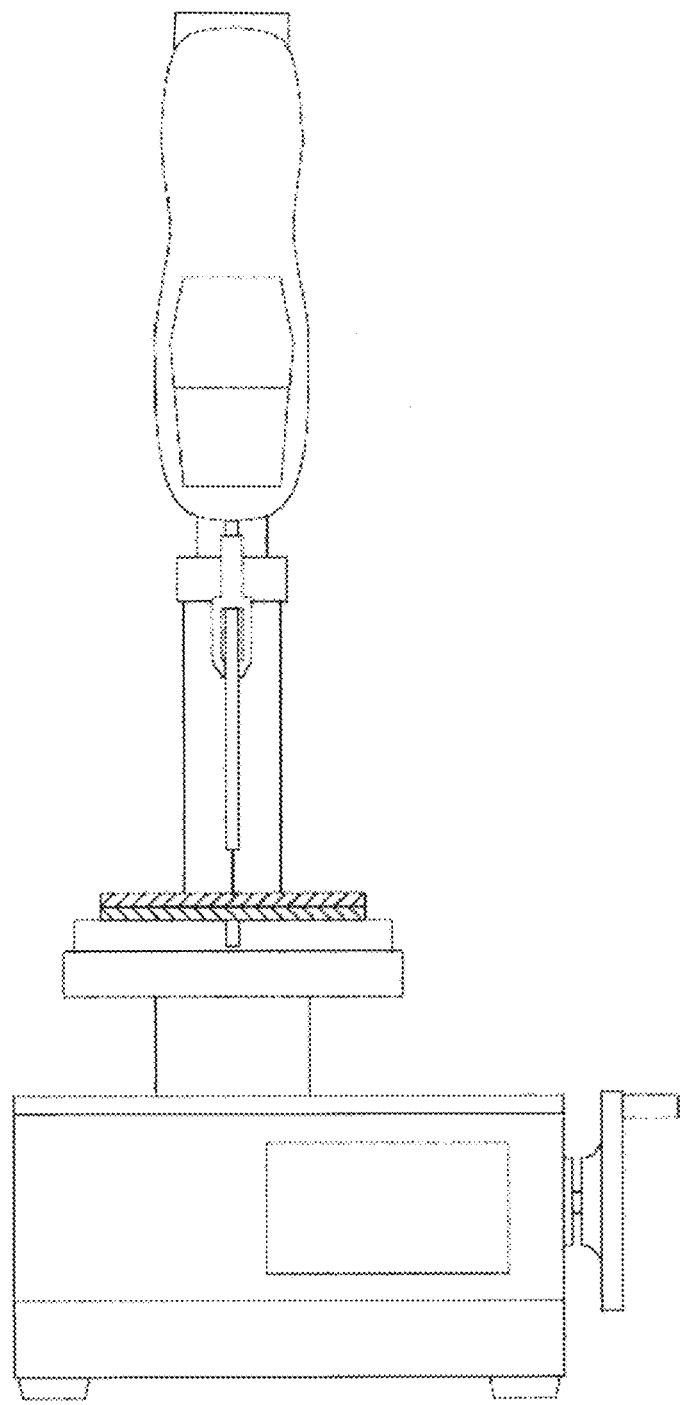

[FIG. 7]
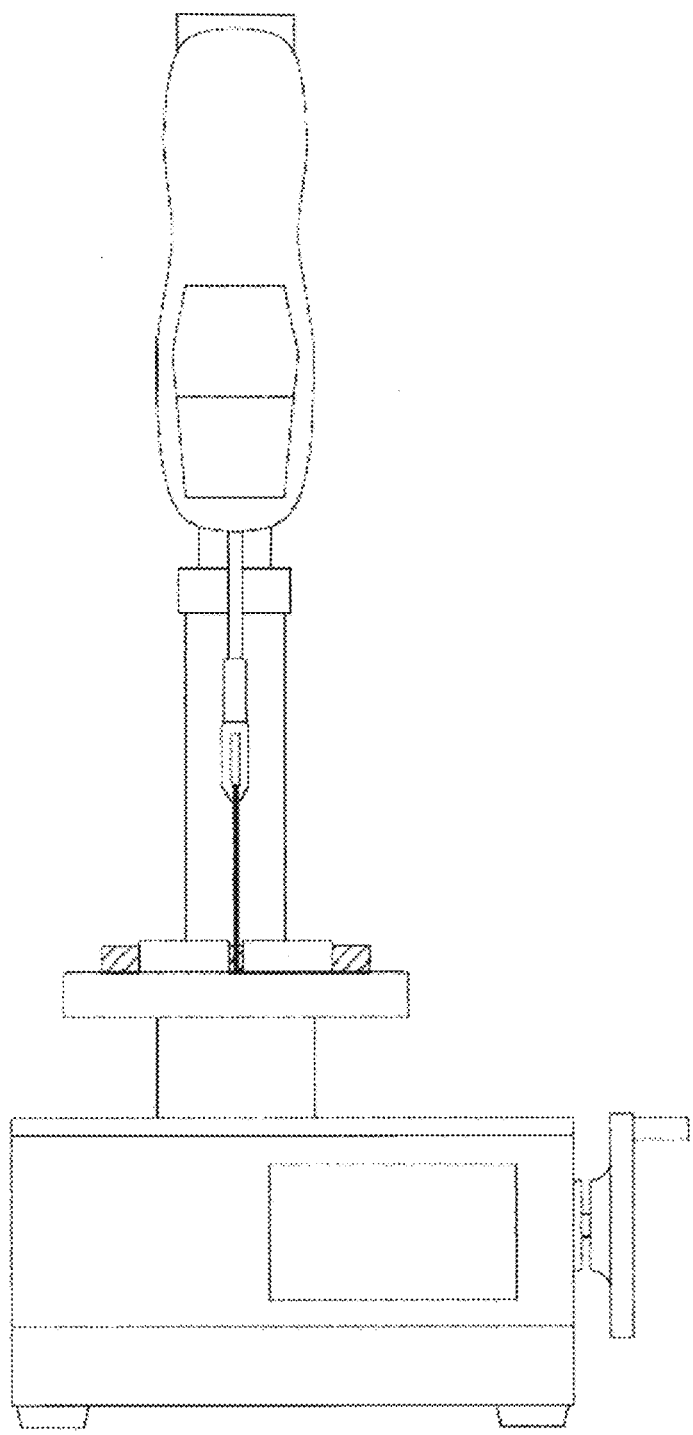

[FIG. 8A]
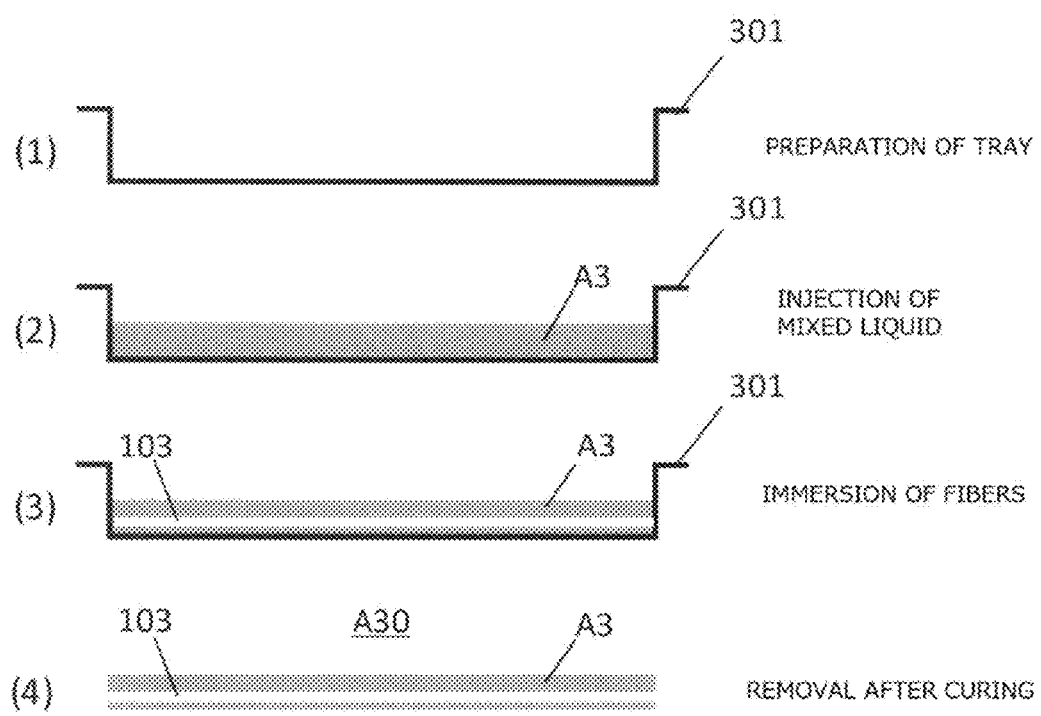

[FIG. 8B]
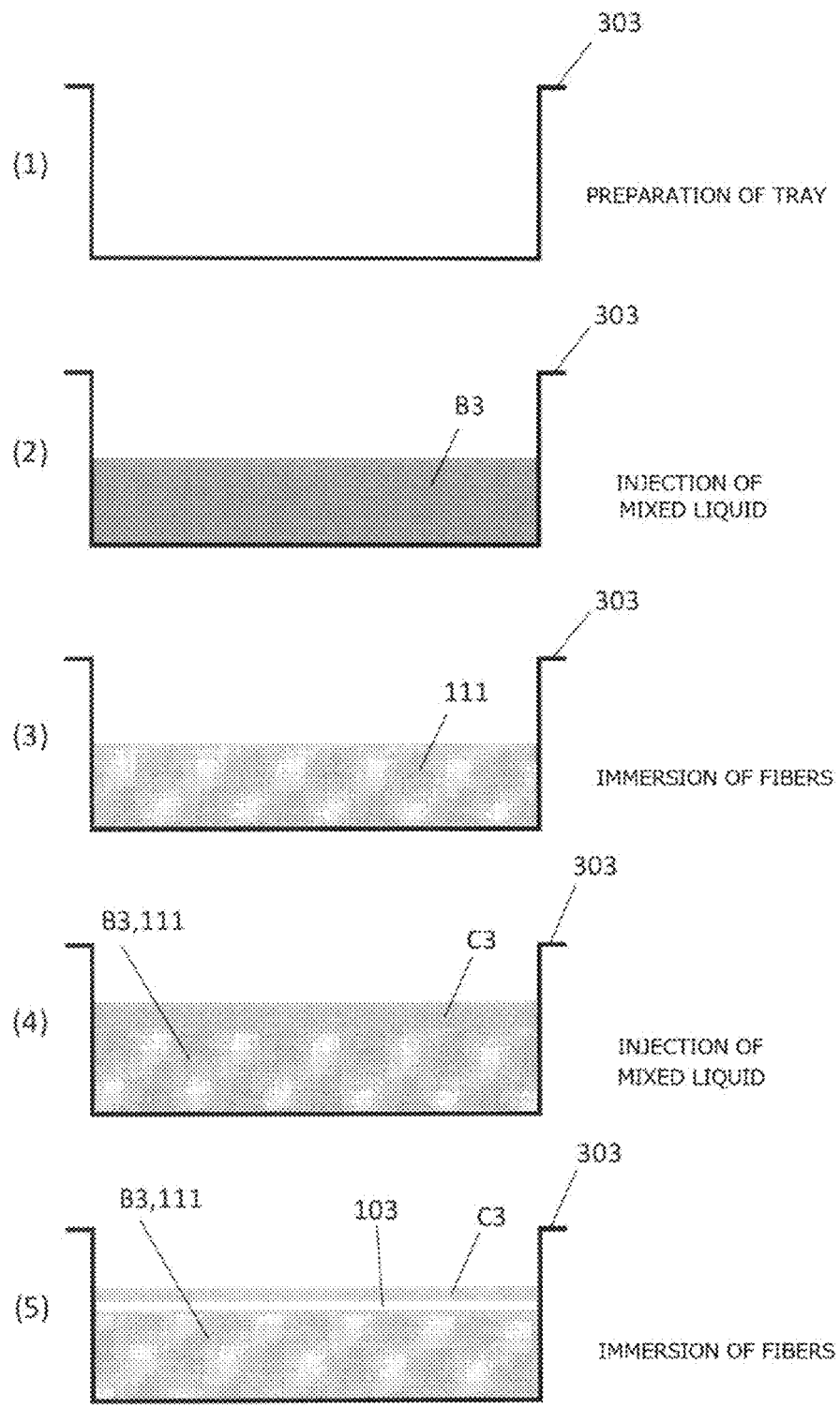

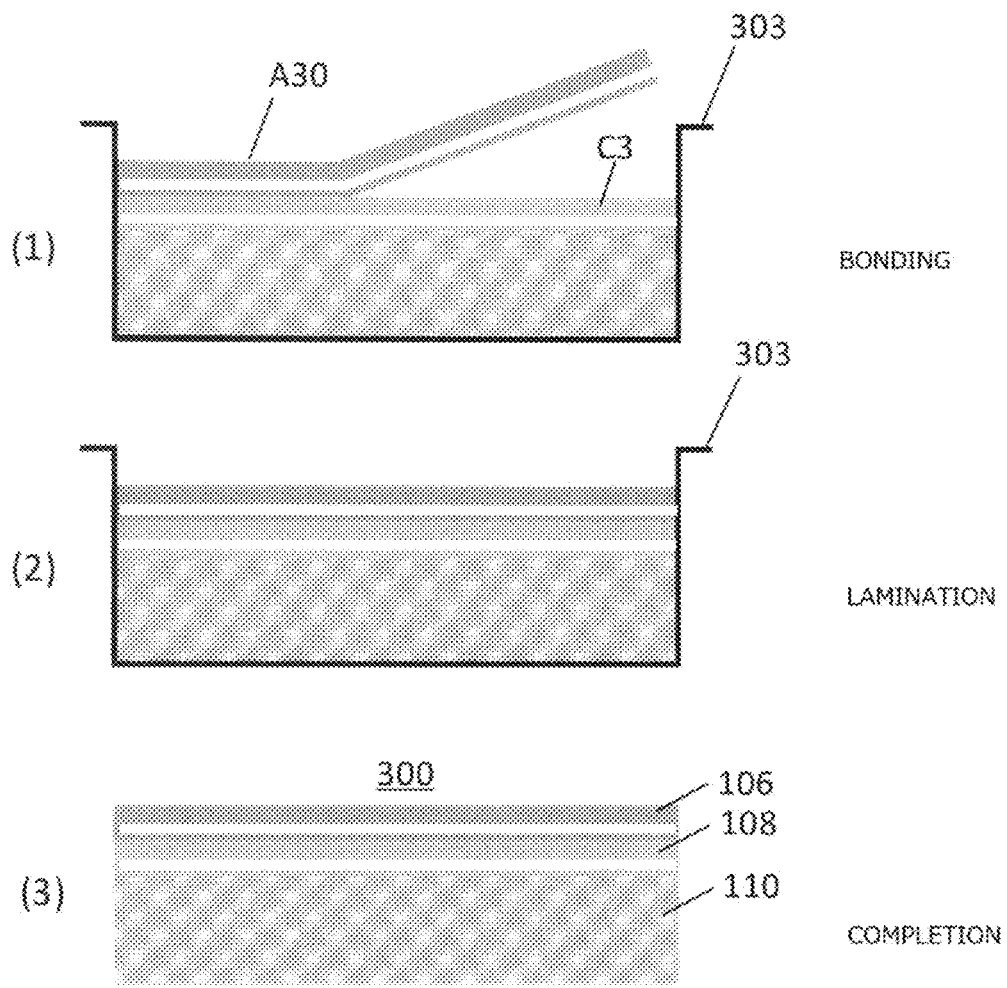
[FIG. 8C]

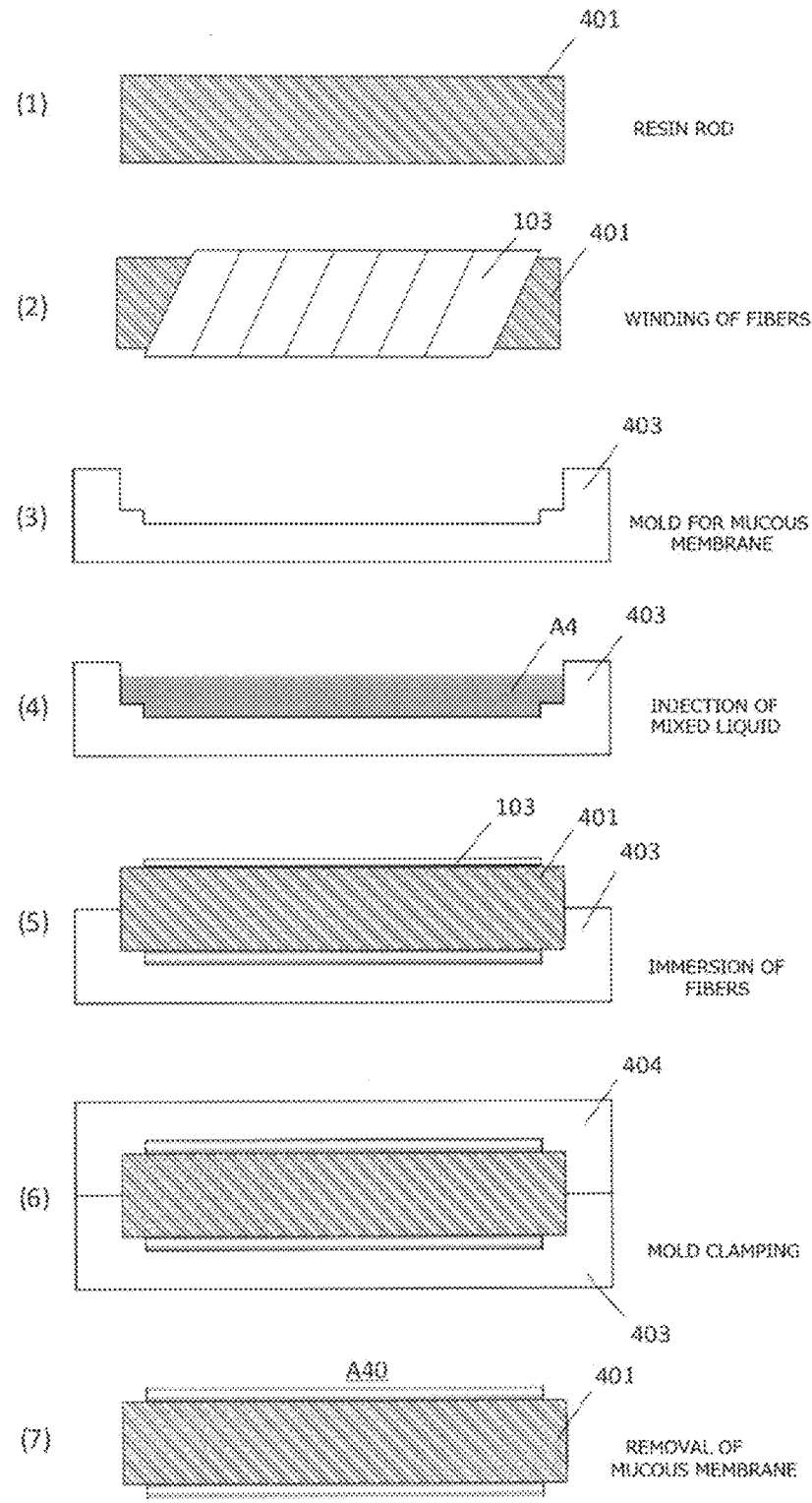

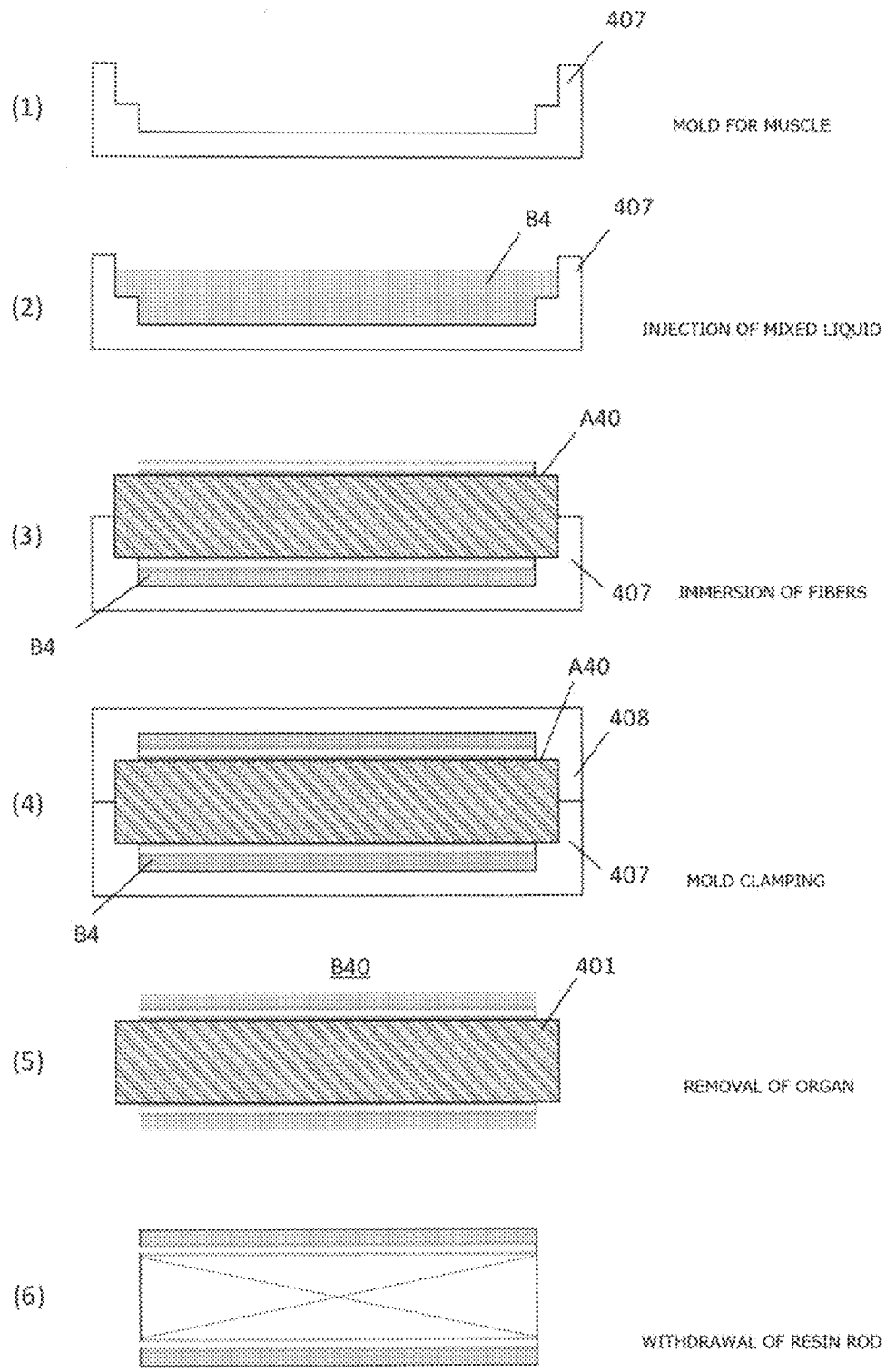

[FIG. 9C]
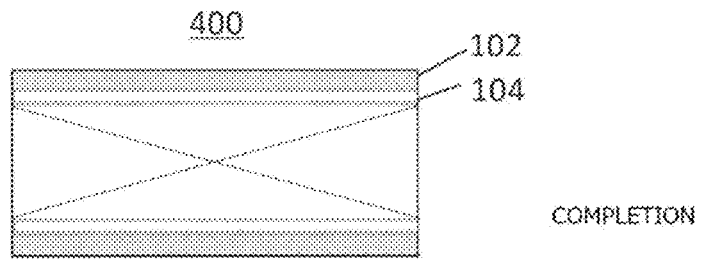
[FIG. 10]
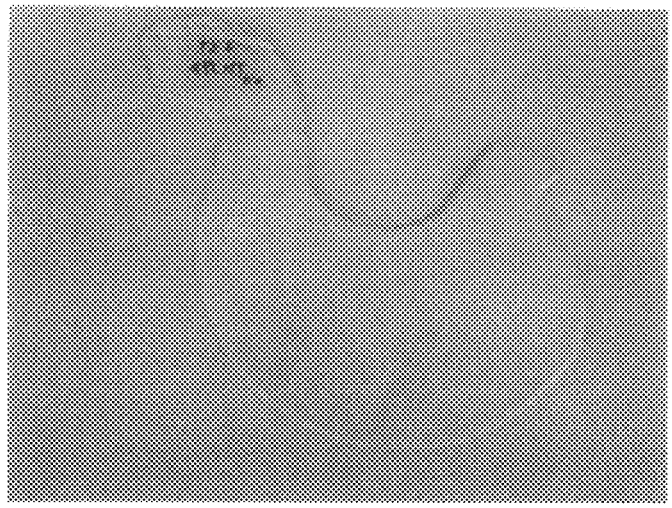
[FIG. 11]
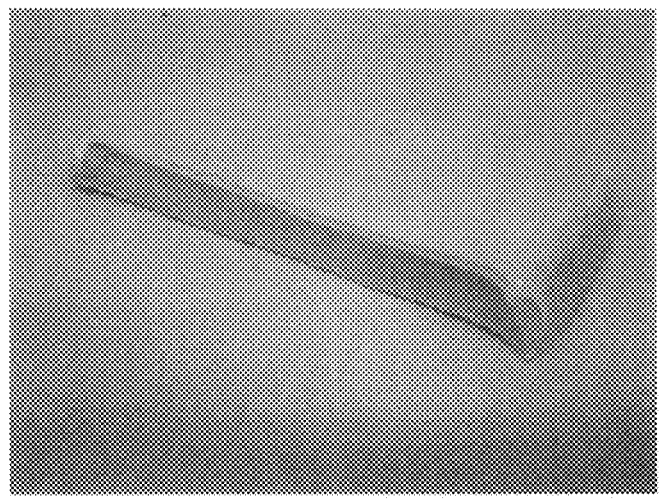

[FIG. 12]
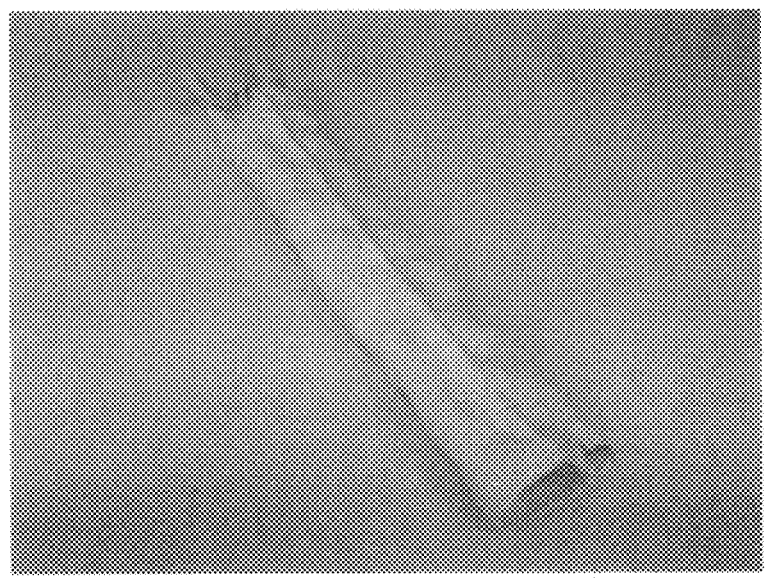
[FIG. 13A]
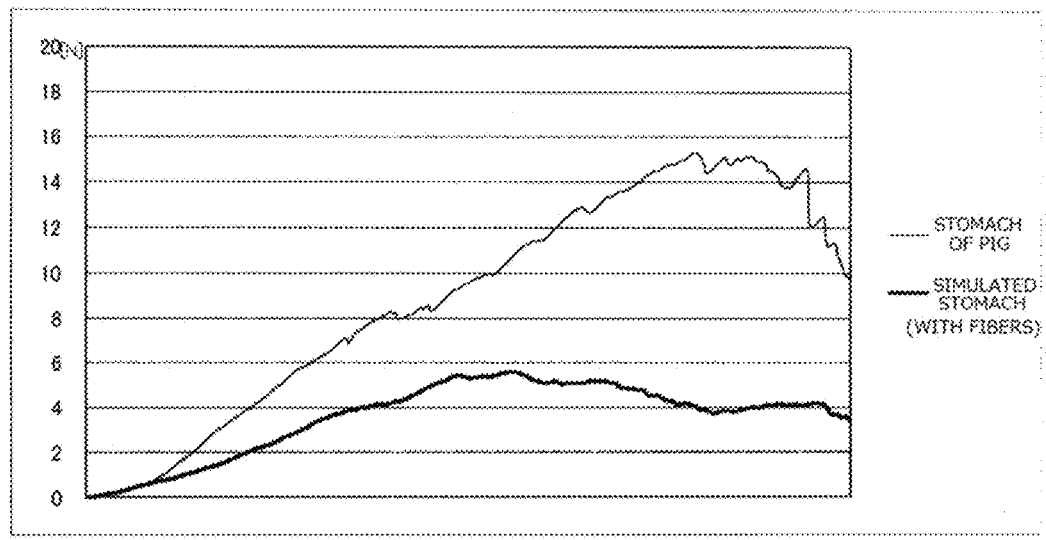

[FIG. 13B]
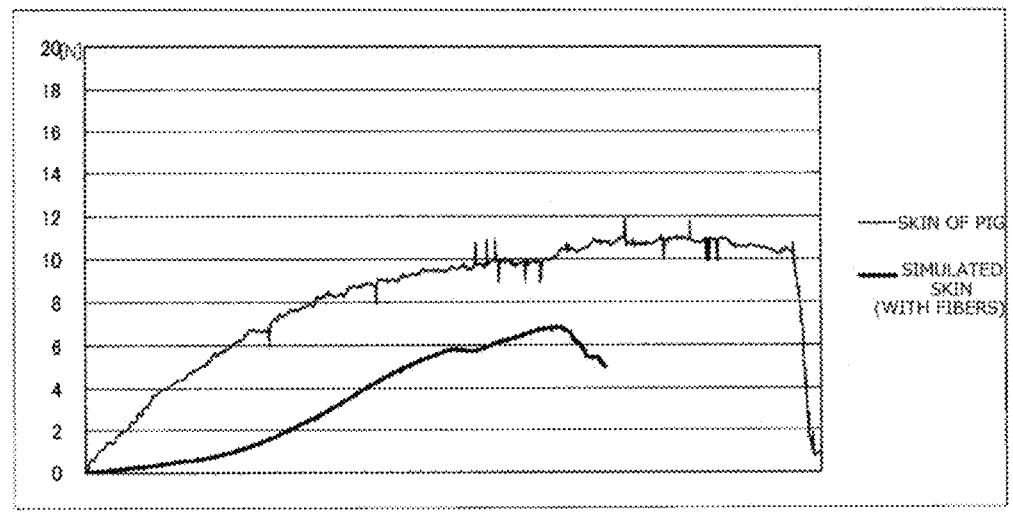
[FIG. 14A]
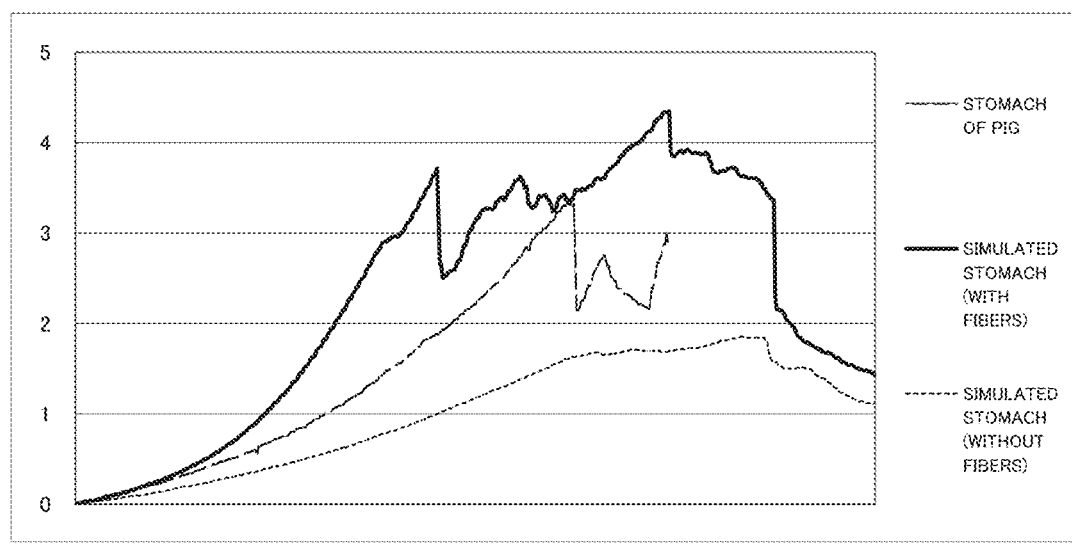

[FIG. 14B]
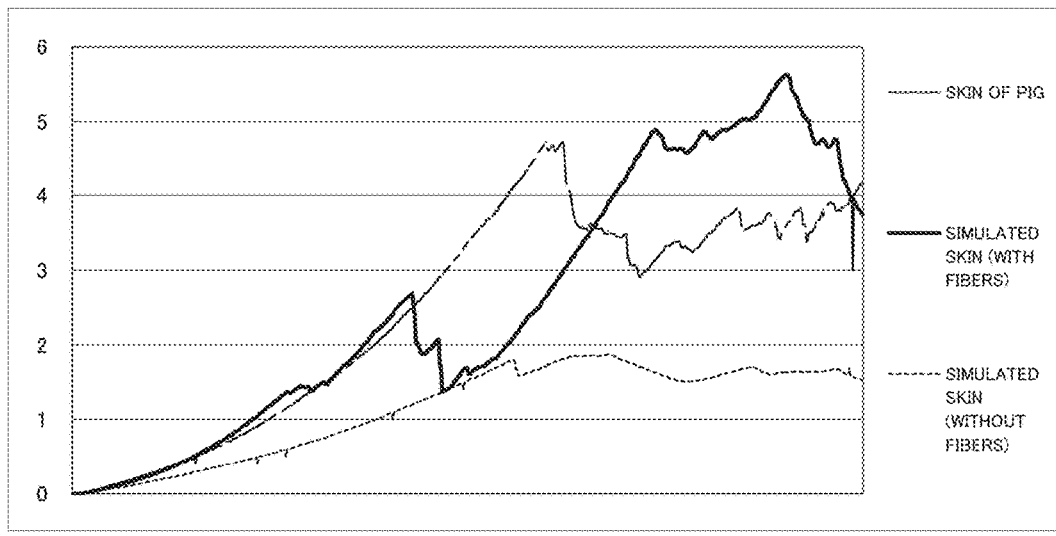
[FIG. 14C]
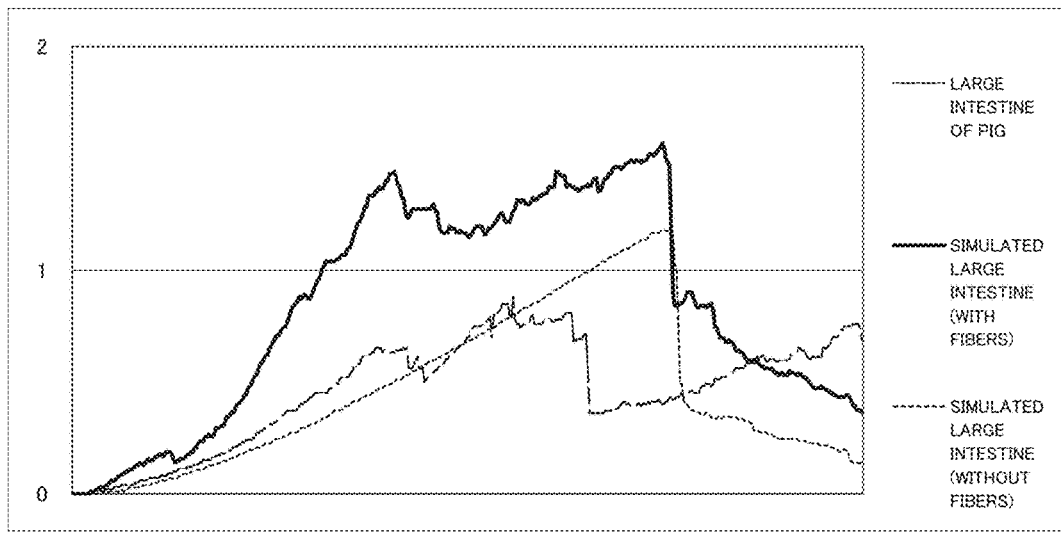

[FIG. 15A]
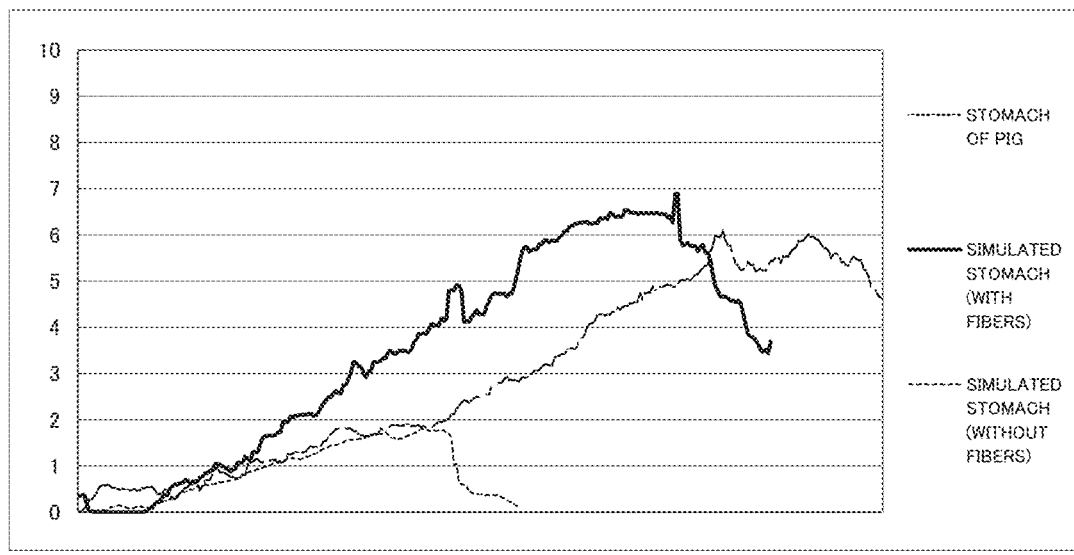
[FIG. 15B]
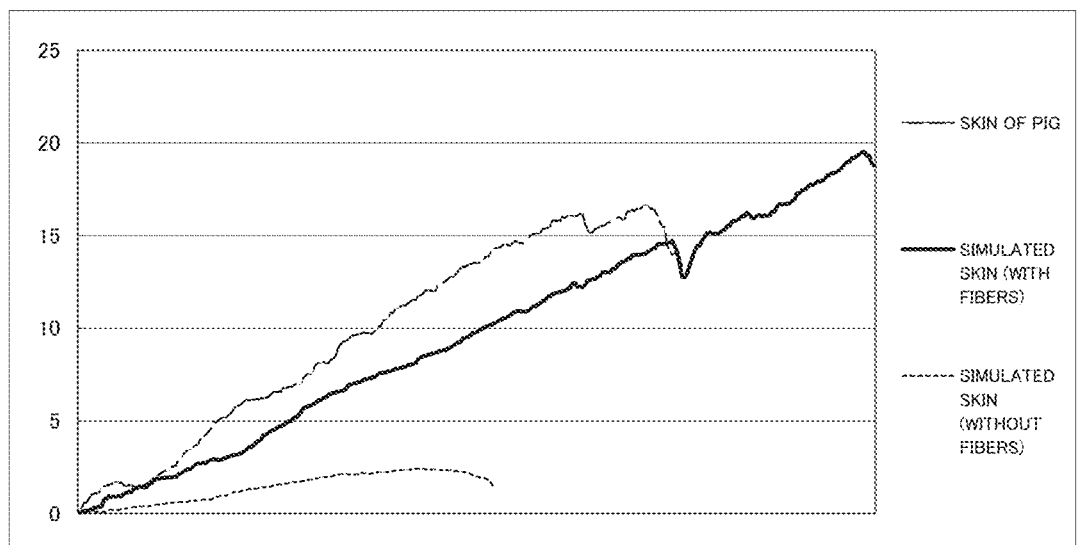

[FIG. 15C]
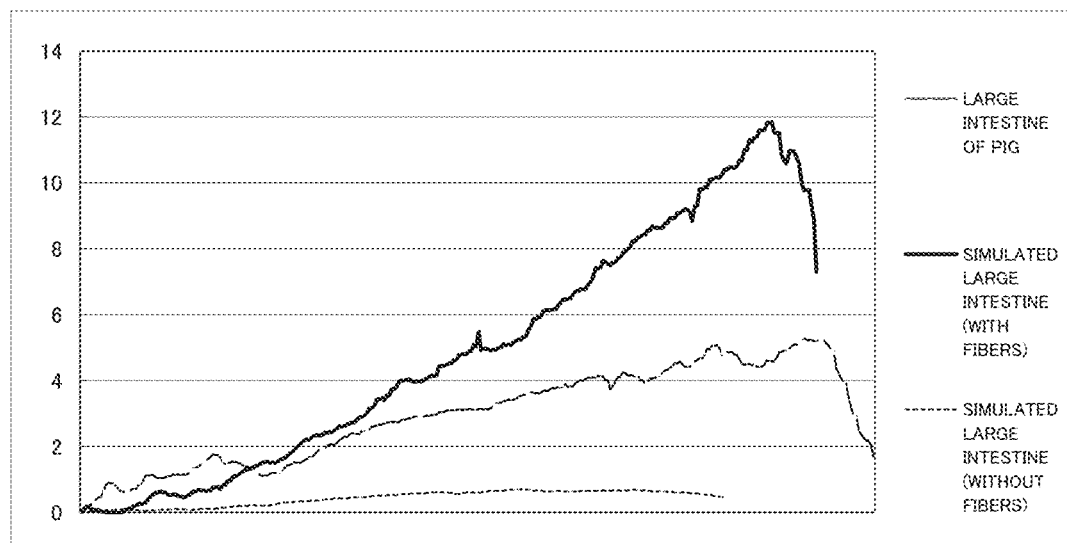
[FIG. 16]
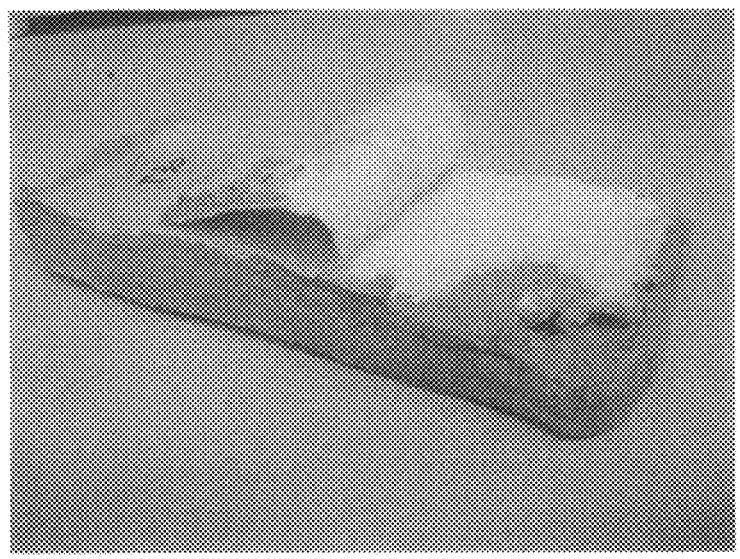

ORGAN MODEL

TECHNICAL FIELD

The present invention relates to an organ model. Specifically, the present invention relates to an artificial organ model, an artificial tissue model or an artificial part model to which inherent texture and performances have been imparted, which can be utilized in medical treatments including operations, injections and the like, or studying, training and practice in dissection, and to a production method for and a molded product of the artificial organ model, artificial tissue model or artificial part model.

BACKGROUND ART

In medical treatments, an operation that requires dissection and suture requires an advanced technology, and the technique thereof is directly linked to the quality of the operation, and is sometimes an important factor that relates to the success and failure of the operation. In order to improve the technology or increase the quality of the operation, it is desirable to make an environment in which training can be repeatedly conducted under a state that is close to an actual condition as possible.

In the past, organs and tissues of animals isolated from pigs or the like were used, but the shapes, sizes and textures are completely out of those of actual human organs and tissues, and they have problems in transport, storage, abnormal odor, hygiene, disposition and the like, and are socially responsible, and thus have been avoided in recent years.

Therefore, artificial organ models and tissue model s have been required, and molded products by soft materials have been suggested (Patent Literatures 1 and 2).

CITATION LIST

Patent Literature

Patent Literature 1: JP 2013-015789 A
Patent Literature 2: JP 2011-22522 A

SUMMARY OF INVENTION

Technical Problem

Essentially, in order to increase the accuracy of the evaluation of the performance of a preliminary practice before an operation, or operation training, or an operation instrument, it is more necessary to impart properties to an organ model, than to impart appearance and texture to an organ model.

Originally, each organ in a living organism is formed by lamination of tissues having different properties such as an epidermis, a dermis and a subcutaneous tissue, or a mucous membrane, a muscle layer and a serosal membrane. A body wall surrounding those organs also has a multilayer structure of a subcutaneous tissue, a muscle layer, a pleuron, a peritoneum and the like. In an actual operation, dissected parts are independently sutured in each layer, though it depends on the kind of the organ and the operative procedure. Thus, an artificial organ model used during training is also necessitated to have a property such that each layer suitably peels off. Furthermore, it is very important that the appearance shape and surface texture of an entire molded product in which those layers are combined can be maintained while maintaining the individual properties.

However, for example, in Patent Literature 1 and the like, it seems that plural layers are formed, but the layers are formed by merely superposing materials having different colors and hardnesses. Therefore, if the layers are peeled off aiming at separation, tears may generate from unspecified portions, and thus the layers are not suitable for the operation training for each layer.

Furthermore, in the case where a skin tissue is to be dissected, if sliding and a sense of catching are present besides a sense of elasticity that is felt when a surgical knife cuts the skin tissue open, then training can be conducted with a touch that is closer to reality.

However, in Patent Literatures 1 and 2 and the like, the properties are fixed depending on the properties of the resins that form the layers. Therefore, if the hardness and surface touch of an artificial organ model can be realized by certain amounts, it is difficult to impart complex feeling such as sense of catching to the artificial organ model.

Furthermore, similarly, if there are touches such as degree of resistance when an operation needle is passed during suturing and inosculation, and a property such that a knot of a thread gets caught, then training can be conducted with a touch that is closer to reality. During suturing, ligation for fixing a thread by tying the thread at the end thereof is conducted. However, a knot gets into the layer at a surface hardness that is close to that of an actual organ, and further, the surface of the layer is slit by the thread. When the surface hardness is increased, the organ becomes a hard one that is far from an actual organ, and the strength of the organ becomes greater than that of the thread, and thus the thread is cut.

Alternatively, there are some barbed ligation threads among ligation threads. However, catch of a thread cannot be replicated in an organ model formed of only a soft material, and thus the thread falls out. However, in the conventional technologies as in Patent Literatures 1 and 2, it is necessary to increase the hardness of the material so as to make the thread get caught, and thus it was difficult to prevent the falling out of the thread while maintaining the hardness and touch of the material.

For these reasons, the organ models that have been conventionally suggested merely replicate, mainly shapes, a single characteristic. Therefore, that organ models cannot satisfy demands for training of dissection and suturing, which is the purpose of the present application. It is difficult to say that that organ models are suitable for the purposes.

Therefore, the present invention was made in view of the above-mentioned problems, and aims at providing an organ model having a property such that each layer suitably peels off, a property such that sliding or a sense of catching is present besides a sense of elasticity that is felt when a surgical knife cuts the organ model open, and a property such that ligation can be performed without burying of a suture thread, and a property such that a knot of the thread gets caught on the organ model.

Solution to Problem

The present inventors did intensive studies so as to solve the above-mentioned problems, and found that the above-mentioned problems can be solved in the case of an organ model characterized by being a laminated body in which plural layers each formed of a hydrogel material are laminated, and one or more of the layers is each a fiber group-containing layer in which fiber groups are approximately continuously present inside the layer and over the plane of the layer, and then finally completed the present invention based on this finding.

The present invention is an organ model being a laminated body in which plural layers each formed of a hydrogel material are laminated, and one or more of the layers is each a fiber group-containing layer in which fiber groups (except for fibrous structures made of collagen) are approximately continuously present inside the layer and over the plane of the layer.

Here, a layer that is adjacent to the fiber group-containing layer may be capable of being peeled off in the vicinity of an interface between the fiber group-containing layer and the adjacent layer.

Further, the strength of the peeling off may be from 0.1 to 50 N/cm.

Further, the laminated body further may have a layer enclosing fibers being a steric mesh-like structural body as a layer other than the fiber group-containing layer.

Further, the organ may be a skin, a glossopharyngeal part, a lung, a liver, a pancreas, a spleen, a kidney, a thyroid, a parathyroid, an adrenal gland, a peritoneum or a prostate.

Further, the laminated body may have, as at least two fiber group-containing layers, a fiber group-containing layer enclosing a first fiber group and a fiber group-containing layer enclosing a second fiber group, or the laminated body may have, as at least one fiber group-containing layer, a fiber group-containing layer enclosing at least a first fiber group and a second fiber group.

Further, the first fiber group and the second fiber group may be capable of being peeled off.

Further, the organ may be a heart, a chest wall, an abdominal wall, a diaphragm, a gallbladder, a stomach, a urinary bladder, a peritoneum or a skin.

Further, the laminated body may have only one of the fiber group-containing layers.

Further, the laminated body may have a tubular shape when the laminated body is seen from a cross-sectional surface in the lamination direction.

Further, the organ may be an esophagus, a stomach, a small intestine, a large intestine, a biliary duct, a pancreatic duct, a urinary bladder, a urinary duct, a urethral tube, a vagina, an anus, a portal vein or a large blood vessel.

Further, the fiber group may be a fiber sheet.

Further, the hydrogel material may contain a polyvinyl alcohol.

Further, at least one of the layers each formed of a hydrogel material may be a first colored layer having a certain color, and at least one of the layers that are different from the first colored layer may be a second colored layer having a different color from the certain color.

The present invention is an organ model being a laminated body in which plural layers each formed of a hydrogel material are laminated, wherein one or more of the layers is each a fiber group-containing layer in which fiber groups are approximately continuously present inside the layer and over the plane of the layer, and the laminated body further has a layer enclosing fibers being a steric mesh-like structural body as a layer other than the fiber group-containing layer.

Here, a layer that is adjacent to the fiber group-containing layer may be capable of being peeled off in the vicinity of an interface between the fiber group-containing layer and the adjacent layer.

Further, the strength of the peeling off may be from 0.1 to 50 N/cm.

Further, the organ may be a skin, a glossopharyngeal part, a lung, a liver, a pancreas, a spleen, a kidney, a thyroid, a parathyroid, an adrenal gland, a peritoneum or a prostate.

The present invention is an organ model being a laminated body in which plural layers each formed of a hydrogel material are laminated, wherein one or more of the layers is each a fiber group-containing layer in which fiber groups are approximately continuously present inside the layer and over the plane of the layer, and the laminated body has, as at least two fiber group-containing layers, a fiber group-containing layer enclosing a first fiber group and a fiber group-containing layer enclosing a second fiber group, or the laminated body has, as at least one fiber group-containing layer, a fiber group-containing layer enclosing at least a first fiber group and a second fiber group.

Here, the laminated body may be capable of being peeled off between the first fiber group and the second fiber group.

Further, the organ may be a heart, a chest wall, an abdominal wall, a diaphragm, a gallbladder, a stomach, a urinary bladder, a peritoneum or a skin.

The present invention is an organ model being a laminated body in which plural layers each formed of a hydrogel material are laminated, wherein one or more of the layers is each a fiber group-containing layer in which fiber groups are approximately continuously present inside the layer and over the plane of the layer, and the laminated body has only one of the fiber group-containing layers, and has a tubular shape when the laminated body is seen from a cross-sectional surface in the lamination direction.

Here, a layer that is adjacent to the fiber group-containing layer may be capable of being peeled off in the vicinity of an interface between the fiber group-containing layer and the adjacent layer.

Further, the strength of the peeling off may be from 0.1 to 50 N/cm.

Further, the organ may be an esophagus, a stomach, a small intestine, a large intestine, a biliary duct, a pancreatic duct, a urinary bladder, a urinary duct, a urethral tube, a vagina, an anus, a portal vein or a large blood vessel.

Further, the hydrogel material may contain a polyvinyl alcohol.

The present invention is an organ model being a laminated body in which plural layers each formed of a hydrogel material are laminated, wherein one or more of the layers is each a fiber group-containing layer in which fiber groups are approximately continuously present inside the layer and over the plane of the layer, and the hydrogel material contains a polyvinyl alcohol.

Here, a layer that is adjacent to the fiber group-containing layer may be capable of being peeled off in the vicinity of an interface between the fiber group-containing layer and the adjacent layer.

Further, the strength of the peeling off may be from 0.1 to 50 N/cm.

Further, the fiber group may be a fiber sheet.

Further, at least one of the layers each formed of a hydrogel material may be a first colored layer having a certain color, and at least one of the layers that are different from the first colored layer may be a second colored layer having a different color from the certain color.

In a certain aspect, the following invention is preferable.

That is, the present invention (1) is an organ model being a laminated body in which plural layers each formed of a hydrogel material are laminated, wherein one or more of the layers is each a fiber group-containing layer in which fiber groups are approximately continuously and eccentrically present inside the layer and over the plane of the layer.

The present invention (2) is the organ model of the invention (1), wherein a layer that is adjacent to the fiber group-containing layer is capable of being peeled off in the vicinity of an interface between the fiber group-containing layer and the adjacent layer.

The present invention (3) is the organ model of the invention (2), wherein the strength of the peeling off is from 0.1 to 50 N/cm.

The present invention (4) is the organ model of any one of the inventions (1) to (3), wherein the laminated body further has a layer enclosing fibers being a steric mesh-like structural body as a layer other than the fiber group-containing layer.

The present invention (5) is the organ model of the invention (4), wherein the organ is a skin, a glossopharyngeal part, a lung, a liver, a pancreas, a spleen, a kidney, a thyroid, a parathyroid, an adrenal gland, a membrane (such as a peritoneum) or a prostate.

The present invention (6) is the organ model of any one of the inventions (1) to (3), wherein the laminated body has, as at least two fiber group-containing layers, a fiber group-containing layer enclosing a first fiber group and a fiber group-containing layer enclosing a second fiber group, or the laminated body has, as at least one fiber group-containing layer, a fiber group-containing layer enclosing at least a first fiber group and a second fiber group.

The present invention (7) is the organ model of the invention (6), wherein the laminated body is capable of being peeled off between the first fiber group and the second fiber group.

The present invention (8) is the organ model of the invention (6) or (7), wherein the organ is a heart, a chest wall, an abdominal wall, a diaphragm, a gallbladder, a stomach, a urinary bladder, a peritoneum or a skin.

The present invention (9) is the organ model of any one of the inventions (1) to (3), wherein the laminated body has only one of the fiber group-containing layers.

The present invention (10) is the organ model of the invention (9), wherein the laminated body has a tubular shape when the laminated body is seen from a cross-sectional surface in the lamination direction.

The present invention (11) is the organ model of the invention (9) or (10), wherein the organ is an esophagus, a stomach, a small intestine, a large intestine, a biliary duct, a pancreatic duct, a urinary bladder, a urinary duct, a urethral tube, a vagina, an anus, a portal vein or a large blood vessel.

The present invention (12) is the organ model of any one of the inventions (1) to (11), wherein the fiber group is a fiber sheet.

The present invention (13) is the organ model of any one of the invention (1) to (12), wherein the hydrogel material contains a polyvinyl alcohol.

The present invention (14) is the organ model of any one of the inventions (1) to (13), wherein at least one of the layers each formed of a hydrogel material is a first colored layer having a certain color, and at least one of the layers that are different from the first colored layer is a second colored layer having a different color from the certain color.

Effects of Invention

According to the present invention, it becomes possible to provide an organ model having a property such that each layer suitably peels off, a property such that sliding or a sense of catching is present besides a sense of elasticity that is felt when a surgical knife cuts the organ model open, and a property such that ligation can be performed without burying of a suture thread, and a property such that a knot of the thread gets caught on the organ model.

BRIEF DESCRIPTION OF DRAWINGS

FIG. 1 is a partial cross-sectional view of an organ model of a first exemplary embodiment, which has two layers of the above-mentioned fiber group-containing layers.

FIG. 2 is a partial cross-sectional view of an organ model of a second exemplary embodiment, which has a layer including the two layers of the above-mentioned fiber group-containing layers, and fibers being a steric mesh-like structural body enclosed in below the two layers.

FIG. 3 is a partial cross-sectional view of an organ model of a third exemplary embodiment, which includes only one layer of the above-mentioned fiber group-containing layers.

FIG. 4A is a schematic view showing a method for producing the organ model of the first exemplary embodiment.

FIG. 4B is a schematic view showing a method for producing the organ model of the first exemplary embodiment.

FIG. 4C is a schematic view showing a method for producing the organ model of the first exemplary embodiment.

FIG. 5 is an elevational view showing a method of a peeling-off load test.

FIG. 6 is an elevational view showing a method of surgical knife-sting load test.

FIG. 7 is an elevational view showing a method of a thread-tearing load test.

FIG. 8A is a schematic view showing a method for producing an organ model of the second exemplary embodiment.

FIG. 8B is a schematic view showing a method for producing the organ model of the second exemplary embodiment.

FIG. 8C is a schematic view showing a method for producing the organ model of the second exemplary embodiment.

FIG. 9A is a schematic view showing a method for producing an organ model of a third exemplary embodiment.

FIG. 9B is a schematic view showing a method for producing the organ model of the third exemplary embodiment.

FIG. 9C is a schematic view showing a method for producing the organ model of the third exemplary embodiment.

FIG. 10 is a photograph after the finishing of the organ model of Example 1.

FIG. 11 is a photograph after the finishing of the organ model of Example 2.

FIG. 12 is a photograph after the finishing of the organ model of Example 3.

FIG. 13A is a drawing showing the results of the peeling-off load tests.

FIG. 13B is a drawing showing the results of the peeling-off load tests.

FIG. 14A is a drawing showing the results of the surgical knife-sting load tests.

FIG. 14B is a drawing showing the results of the surgical knife-sting load tests.

FIG. 14C is a drawing showing the results of the surgical knife-sting load tests.

FIG. 15A is a drawing showing the results of the thread-tearing tests.

FIG. 15B is a drawing showing the results of the thread-tearing tests.

FIG. 15C is a drawing showing the results of the thread-tearing tests.

FIG. 16 is a photograph after the peeling off of the organ model of Example 2.

DESCRIPTION OF EMBODIMENTS

The organ model of the present invention is characterized by being a laminated body in which plural layers each formed of a hydrogel material are laminated, wherein one or more of the layers is each a fiber group-containing layer in which fiber groups are approximately continuously and eccentrically present inside the layer and over the plane of the layer. The number of the layers each formed of a hydrogel material is not limited, and differs depending on the purpose of use. The number of the fiber group-containing layers is also not limited, and differs depending on the purpose of use. The disposition of the fiber group-containing layers and other layers also differs depending on the purpose of use. Furthermore, a laminated body including only layers each formed of a hydrogel material is exemplified as the organ model of the present invention, but the organ model is not limited to this, and may include layers other than the layers each formed of a hydrogel material (layers formed of a soft material other than the hydrogel material, layers containing a hard material).

The preferable embodiments of the present invention will be explained below in detail with referring to drawings. In the specification and drawings, it is deemed that constitutional factors with an identical symbol have a substantially identical structure or function.

The organ model of the present invention will be explained in the following order.
1 First exemplary embodiment
1-1 Constitution of organ model of first exemplary embodiment
1-2 Properties of organ model of first exemplary embodiment
1-3 Intended use and method for use of organ model of first exemplary embodiment
1-4 Method for producing organ model of first exemplary embodiment
2 Second exemplary embodiment
2-1 Constitution of organ model of second exemplary embodiment
2-2 Intended use and method for use of organ model of second exemplary embodiment
2-3 Method for producing organ model of second exemplary embodiment
3 Third exemplary embodiment
3-1 Constitution of organ model of third exemplary embodiment
3-2 Intended use and method for use of organ model of third exemplary embodiment
3-3 Method for producing organ model of third exemplary embodiment The following exemplary embodiments herein are consistently examples, and the materials of the respective layers, the production method (for example, a lamination method) and the like are not limited by the following embodiments. Furthermore, it should not be limitatively understood that each exemplary embodiment is applied to a specific one, and any combination may be used. For example, as long as technical inconsistency is absent, it should be understood that the description for a certain exemplary embodiment is also the description for another exemplary embodiment, and even if a certain description and another description are independently described, it should be understood that a combination of the certain description and the other description is also described. Furthermore, the information on numerical values and the like as specific examples shown in the following exemplary embodiments is consistently an example, and thus may be suitably modified as long as it does not significantly deviate from the purport of the following exemplary embodiments and modified examples.

First Exemplary Embodiment

<<Constitution of Organ Model of First Exemplary Embodiment>>
<Entire Constitution>

The organ model of this exemplary embodiment is characterized by that, depending on the purpose, the laminated body has, as at least two fiber group-containing layers, a fiber group-containing layer enclosing a first fiber group and a fiber group-containing layer enclosing a second fiber group, or the laminated body has, as at least one fiber group-containing layer, a fiber group-containing layer enclosing at least a first fiber group and a second fiber group. In the following, a constitution of a laminated body having, as at least two fiber group-containing layers, a fiber group-containing layer enclosing a first fiber group and a fiber group-containing layer enclosing a second fiber group will be mentioned in detail. That is, in this exemplary embodiment, a laminated body in which only a plurality of fiber group-containing layers are laminated is mentioned in detail, but the laminated body may be a laminated body having at least one layer formed of a fiber group-free hydrogel and at least one fiber group-containing layer. Furthermore, the thickness of the entire laminated body and the thickness of each layer may be suitably modified according to the purpose.

The constitution of the organ model of this exemplary embodiment will be explained with referring to FIG. 1. FIG. 1 is a schematic view of an organ model of this exemplary embodiment, which includes two layers of the above-mentioned fiber group-containing layers. As shown in FIG. 1, the organ model of this exemplary embodiment is an organ model formed by laminating two layers each formed of a hydrogel material (the fiber group-containing layer 104 and the fiber group-containing layer 105), and 101 is an interface of the fiber group-containing layer 104 and the fiber group-containing layer 105.

[Layer Formed of Hydrogel Material]

The layers each formed of a hydrogel material (the fiber group-containing layer 104 and the fiber group-containing layer 105) in the organ model of this exemplary embodiment will be mentioned in detail. In addition, the layer formed of a hydrogel material may further have a coating layer (the material, is, for example, a hydrogel (such as a polyvinyl alcohol)) on the layer. The coating layer (thin film) can be formed by dip coating, application or spraying, or by separately preparing the film and then applying the film.

(Hydrogel Material)

The hydrogel material in this exemplary embodiment is not limited, and for example, polymer gel materials such as a polyvinyl alcohol, a polyethylene glycol and a polyacrylamide, or natural gel materials such as cellulose, starch and collagen can be used. In the problem of the present invention, it is specifically preferable to contain a crosslinked gel formed of a polyvinyl alcohol.

The average polymerization degree of the polyvinyl alcohol is not limited, and is preferably from 500 to 3,000, more preferably from 1,000 to 2,000, further preferably from 1,500 to 2,000. Furthermore, the saponification degree of the polyvinyl alcohol is not limited, and is preferably 90 mol % or more, more preferably 95 mol % or more. The average polymerization degree means, for example, in the case when plural kinds of polyvinyl alcohols having different polymerization degrees are blended, an average polymerization degree of these polyvinyl alcohols.

Furthermore, it is preferable that the crosslinked gel is crosslinked by using dimethylsulfoxide so as to obtain desired properties (for example, suitable hardness). On the other hand, for example, in the case when a subcutaneous tissue in skin is simulated, a non-crosslinked hydrogel can be preferably used.

In the case when the polyvinyl alcohol is crosslinked by using dimethylsulfoxide, the incorporation ratio of the polyvinyl alcohol, dimethylsulfoxide and water is not limited, and for example, the incorporation ratio described in JP 2007-316434A can be used. More specifically, 3 to 30% by weight is preferable, and 8 to 20% by weight is more preferable based on the total weight of a mixed solution containing the polyvinyl alcohol, dimethylsulfoxide and water. Furthermore, the ratio of the dimethylsulfoxide to the water is not limited, and the weight ratio of dimethylfoxide:water is preferably from 3:1 to 1:7, more preferably from 1:2 to 1:6.

(Fiber Groups)

Here, the layer formed of a hydrogel material in this exemplary embodiment is a layer containing fiber groups (a fiber group-containing layer), in which fiber groups are approximately continuously and eccentrically present inside the layer and over the plane of the layer. The positions and state of the fiber groups in the fiber group-containing layer are sufficient and not limited as long as the fiber groups are approximately continuously and eccentrically present inside the layer and over the plane of the layer. In this exemplary embodiment, the fiber groups are in a sheet-like fiber sheet 103, but is not limited to this, and may also be, for example, in a state wherein the fibers are rounded and buried, a state wherein the fibers are folded in an accordion shape, or the like.

Material

The material of the fiber groups is not limited, and general fibers may be suitably used according to the purpose. For example, natural fibers (for example, plant fibers, animal fibers), feathers, chemical fibers (regenerated fibers, semi-synthetic fibers, synthetic fibers, inorganic fibers) and the like can be exemplified. More specific examples can include plant fibers such as cellulose or fibers containing cellulose as a major component (for example, cotton, hemp, paper); animal fibers such as pelage, wool, sheep wool, animal hair, angora, cashmere, mohair, alpaca, camel and silk; feathers such as down and feather; regenerated fibers such as rayon, polynosic, cupra, tensel and lyocell; semi-synthetic fibers such as acetate, triacetate and promix; synthetic fibers such as nylon, vinylon, vinylidene, polyvinyl chloride, polyesters, acrylics, acrylic-based, polyethylene, polypropylene, polyurethane, polychlal and aramide; and inorganic fibers such as carbon fibers, glass fibers and metal fibers. Preferably, besides the cellulose or fibers containing cellulose as a major component (for example, hemp, paper, cotton and the like), pelage, rayon and the like, chemical fibers such as acrylic, polyester, polypropylene and nylon, or carbon fibers or the like may be used. Furthermore, the shape of the fiber group is not limited and different depending on the purpose, and examples include sheet-like fiber groups such as woven fabrics and nonwoven fabrics, steric mesh-like fiber groups (for example, cotton-like), foamed fiber groups, and the like. Among these, sheet-like fiber groups are preferable since the layer thickness of an actual organ is thin, the tension in the plane direction can be maintained, and thus a peeling plane can be easily preset. By using such sheet-like fiber group, for example, the fiber group serves as a core, whereby the strength (specifically tensile strength) in the stretch direction can be improved. Furthermore, since the fibers are in a bonded state, a tear surface can be easily preset. Furthermore, it is also possible to form a thin layer. Here, an embodiment in which the shape of the fiber group is a steric mesh-like shape (for example, a cotton-like shape) will be mentioned in detail in the second exemplary embodiment mentioned below.

Thickness and Mass Per Unit Area

The thickness of the fiber group differs depending on the purpose and is not limited, and is, for example, about 0.01 to 10 mm. The mass per unit area of the fiber group is not limited, and may be, for example, 5 to 300 g/m$^2$ or the like.

By disposing such fiber group-containing layer, for example, it is possible to impart a peeling-off property of the layer (this will be mentioned below), and by incorporating the fiber groups, the fiber groups serve as a core, and thus it is possible to improve the strength (specifically tensile strength) in the stretch direction, and further, it is also possible to form a thin shape. Furthermore, by changing the material, thickness and mass per unit area, the method of disposition and the like of the fiber groups, it is possible to obtain a desired strength.

(Other Components)

A colorant can be added to the hydrogel material depending on the purpose of use. By coloring with a colorant, the organ model can have a color that is close to the color of an organ of a human body. More specifically, the organ model of this exemplary embodiment may be a laminated body including a first colored layer having a certain color and a second colored layer having a color that is different from the certain color. By laminating layers having different colors in such way, a constitution that is close to an actual organ can be formed. In this case, the laminated body may also be a laminated body further including a layer having a color other than the certain color and the different color.

Furthermore, other known additives (for example, an antioxidant and the like) may also be added to the above-mentioned hydrogel material.

The plate-like laminated body 100 of this exemplary embodiment has been explained above, but the laminated body 100 can be formed into an organ model having a structure having a void inside such as bag-like, cylindrical and tubular shapes by suitably combining or the like.

<<Properties of Organ Model of First Exemplary Embodiment>>

<Peeling-Off Property>

In the organ model of this exemplary embodiment, a layer that is adjacent to the fiber group-containing layer is capable of being peeled off in a membrane shape in the vicinity of an interface between the fiber group-containing layer and the adjacent layer. This is because the fiber group-containing layer has strength against peeling off due to the presence of the fiber groups, and the layer is peeled off in a membrane shape in the vicinity of the interface where binding is weak. Such property can be confirmed by the following test.

Furthermore, since the fiber group-containing layer in the laminated body of this exemplary embodiment has the above-mentioned strength, peeling off is possible between a first fiber group and a second fiber group, in the case when the laminated body includes two or more fiber group-containing layers of a first fiber group-containing layer and a second fiber group-containing layer, the fiber group contained in the first fiber group-containing layer is the first fiber group, and the fiber group contained in the second fiber group-containing layer is the second fiber group, or one or more of the fiber group-containing layers contains two or more of the above-mentioned fiber groups of a first fiber group and a second fiber group.

That is, although the laminated body 100 of this exemplary embodiment is a laminated body having a fiber group-containing layer enclosing a first fiber group and a fiber group-containing layer enclosing a second fiber group, the laminated body may have another structure including, as at least one fiber group-containing layer, a fiber group-containing layer enclosing at least a first fiber group and a second fiber group. By such structure, a similar effect can be exerted {that is, the fiber group is capable of being peeled off from the fiber group (in the layer) in a film-like form}.

(Peeling-Off Load Test)

The peeling-off load is a load when layers are peeled off into two layers from an interface that forms the layers of a subject, and a low load is exhibited when the bonding force of the layers is weak. When the bonding force of the layers is strong, a high load is exhibited. The peeling-off load in this exemplary embodiment is preferably from 0.1 to 50 N/cm, more preferably from 0.1 to 10 N/cm. More specifically, the peeling-off load differs depending on the kind of an organ model as a subject, and for example, in the case of a stomach model, the peeling-off load is preferably from 0.2 to 5 N/cm, more preferably from 0.5 to 2.5 N/cm. By setting to this range, the layers have a property such that the each layer suitably peels off, and thus a sense of peeling off that is closer to reality can be obtained. This peeling-off load herein is calculated from a value measured according to the following measurement method. In addition, the peeling-off load sometimes differs depending on the place of the organ model, and in this case, the strength in either place may be within the above-mentioned range, or the strengths in all places may be within the above-mentioned range.

SV-5-L manufactured by Imada is used as a tensile tester, and DPX-5TR manufactured by Imada is used as a loading meter. The test samples are uniformed in advance into rectangles each having a clamp width of 5 cm and another side of 10 cm. As shown in FIG. 5, the portion to be peeled off (the gap between the layers in FIG. 5) is peeled off in advance by about 3 cm, and 1 cm from the end parts on the approximately the center of the upper layer and the lower layer are respectively fixed by clamps, the layers are placed, and a peeling-off load is measured under a test condition of a tensile velocity: 30 mm/min. The maximum value during from the initial state to the time when the layers have been completely peeled off is deemed as the peeling-off load. The measured value (N) is divided by the clamp width (5 cm) of the test sample, whereby the peeling-off load (N/cm) is calculated.

<Dissection and Stinging Resistance>

Furthermore, since the above-mentioned fiber group-containing layer contains fiber groups, the laminated body has a sense of elasticity that is felt when cutting open it with a surgical knife (by cutting the fiber groups), and properties with sliding and a sense of catching. Furthermore, when an operation needle is passed during suturing or inosculation, by passing the needle through the fiber group, the laminated body has a degree of resistance when the operation needle is passed during suturing or inosculation, and a property such that a knot of the thread gets caught. Such properties can be confirmed by the following test.

(Surgical Knife-Sting Load Test)

The surgical knife-sting load is a load when a subject is vertically stung by a surgical knife, and when the subject is soft, a low load is exhibited. When the subject is hard, a high load is exhibited. If the subject is fibrous, or the material is not homogeneous, then the load gives a zigzagged waveform. If the shape of the waveform is close to the shape of the waveform in the case when stinging is conducted in an actual organ, then the sense of catching that is felt when cutting open it with the surgical knife becomes closer to reality. Furthermore, the surgical knife-sting loading in this exemplary embodiment differs depending on the kind of the organ model as a subject, and for example, in the case of a stomach model, the surgical knife-sting loading is preferably from 0.5 to 10 N, more preferably from 1.5 to 6 N. By presetting to this range, the sense of elasticity that is felt when cutting open it with a surgical knife, and the sliding and sense of catching become senses that are closer to reality. The surgical knife-sting loading herein is measured by the following measurement method.

Similarly to the above-mentioned peeling-off load test, SV-5-L manufactured by Imada is used as a tensile tester, and DPX-5TR manufactured by Imada is used as a loading meter. As the surgical knife used, a disposable surgical knife No. 10 manufactured by AS-1 was used. As shown in FIG. 6, an organ model s positioned so that the subject organ model is vertically stung with a surgical knife, and the change in load applied to the surgical knife is measured under a test condition of a sting velocity of the surgical knife of: 30 mm/sec. The measurement is conducted from the initial state to the time when the blade of the surgical knife is completely buried in the subject organ model.

(Thread-Tearing Load Test)

A thread is passed through a subject once, and a knot is made to thereby forma ring by which the subject is interposed. The load when this ring of the thread is pulled is measured. If the subject is weak, then a low load is exhibited. If the subject is strong, then a high load is exhibited, and the load becomes zero at the point where the strength goes beyond the strength of the thread. The thread-tearing loading in this exemplary embodiment differs depending on the kind of the organ model as a subject, and for example, in the case of a large intestine model, the thread-tearing loading is preferably from 1 to 30 N, more preferably from 3 to 20 N. By presetting to be in this range, properties such that the hardness is put into a hardness in the range at which the suture thread is not broken, and ligation can be performed without breaking or tearing of the organ model. The thread-tearing loading herein is measured according to the following measurement method.

Similarly to the above-mentioned peeling-off load test, SV-5-L manufactured by Imada was used as a tensile tester, and DPX-5TR manufactured by Imada was used as a loading meter. As shown in FIG. 7, a thread (SAFIL 3/0 70 cm HR26, manufactured by B. BRAUN) was passed at the place at 5 mm from the top surface around the edge of an organ model as a subject, the thread is passed through from the place at 5 mm on the side surface around the edge, and the head and end of the thread are tied into a ring state. The organ model as a subject is fixed on a measurement table of a tensile tester, the opposite side of the thread ring is pulled with a load meter, and the change in load at this time is measured. The measurement is continued during the time from the initial state to the time when the thread is cut, or the edge of the organ model is broken and the thread ring is removed.

<<Use and Method for Use of Organ Model of First Exemplary Embodiment>>

In the case when the laminated body 100 of this exemplary embodiment is used as an organ model, the laminated body has a property that each layer suitably peels off, a property such that sliding or a sense of catching is present besides a sense of elasticity that is felt when a surgical knife cuts the organ model open, and a property such that ligation can be performed without burying of a suture thread, and a property such that a knot of the thread gets caught on the organ model. Therefore, the laminated body can be used as an organ model for preliminary practice before operation, operation training, or for increasing the accuracy of the evaluation of the performances of operation instruments.

The specific use of the laminated body 100 of this exemplary embodiment is not limited, and for example, the laminated body 100 can be used as an organ model wherein the organ is a heart, a chest wall, an abdominal wall, a diaphragm, a gallbladder, a stomach, a urinary bladder, a membrane (for example, a peritoneum) or a skin.

In the case when the laminated body 100 shown in FIG. 1 is used as an organ model of a stomach, the fiber group-containing layer 104 is a mucous membrane layer, and the fiber group-containing layer 105 laminated on the fiber group-containing layer is a muscle layer. 101 is an interface between the layers.

<<Method for Producing Organ Model of First Exemplary Embodiment>>

Subsequently, as a method for producing the organ model of this exemplary embodiment, a method for producing a bag-like organ model (for example, an organ model of a stomach) will be explained as an example. However, known methods can be used without limitation as the method for producing the organ model. The production method in this exemplary embodiment is an example.

The method for preparing an organ model 200 of this exemplary embodiment will be explained with referring to FIG. 4A. The organ model 200 of this exemplary embodiment is a bag-like organ model having a space inside, and has a two-layer structure having a second fiber group-containing layer 105 containing fiber groups, and having, inside of the second fiber group-containing layer 105, a first fiber group-containing layer 104 containing fiber groups (the lamination structure shown in FIG. 1). The second fiber group-containing layer 105 is an organ outside layer, and the first fiber group-containing layer 104 is an organ inside layer.

(Preparation of First Fiber Group-Containing Layer 104)

Preparation of Mixed Liquid A2

The materials for constituting the hydrogel material are formulated and dissolved by stirring under heating to give a mixed liquid A2. The heating temperature is not limited, and is preferably from 60 to 100° C. The heating/stirring time is not limited, and is preferably 1 hour or more, more preferably 3 hour or more as a rough standard. Where necessary, a colorant and the like are added, and the materials are stirred again to the extent that they are mixed.

Impregnation of Fibers

As shown in FIG. 4A (1), a resin mold 201 for a front surface of an organ and a resin mold 202 for a back surface of an organ for a first fiber group-containing layer, wherein the inner surfaces of the molds each has the shape of the organ and the molds are separated into two molds for a front surface and a back surface, are prepared. Since the resin mold 202 for a back surface of an organ is similar to the resin mold 201 for a front surface of an organ, it is not illustrated in some cases. As shown in FIG. 4A (2), the mixed liquid A2 is poured into these two resin molds, the resin mold 201 for a front surface and the resin mold 202 for a back surface of an organ, respectively. As shown in FIG. 4A 13), fiber groups 103 cut into the shape of the organ are put on each resin mold and impregnated with the mixed liquid A2.

Mold Clumping

As shown in FIG. 4A (4), a film 208 cut into the shape of the organ is put on the front surface resin mold 201 for the organ so that air is not enclosed. Furthermore, as shown in FIG. 4A (5), the back surface resin mold 202 for the organ is joined with the front surface resin mold 201 for the organ so that the liquid surfaces of the mixed liquid A2 are joined, and are subjected to mold clumping. The material for the film 208 may be any material that does not adhere to the mixed liquid A2 such as polyethylene, polypropylene and polyvinyl chloride, and is not limited.

In addition, in this example, since the stomach has a bag-like shape, in the first fiber group-containing layer that serves as a core part of the model, the molds are separated into the front surface and back surface of the stomach and are integrated via the film 208 to thereby form a hollow-shaped laminated body. However, in the case when it is not necessary to form the stomach into a bag-like shape (in the case when it is not necessary to visually imitate an organ), a simple laminated body (a plate-like laminated body) may also be formed (in this case, the processes may be suitably omitted or modified in the following processes).

Freezing

The joined resin molds are put into a freezer and left. The freezing temperature is not limited, and is preferably −5° C. or less. The temperature is gradually decreased in some cases. The time for leaving is not limited, and is preferably 0.5 hour or more.

Molding

The resin molds are taken out of the freezer, the molded simulated organ is released from the resin molds, the shape is arranged by trimming the outer periphery part, whereby an organ model A20 of only a first fiber group-containing layer is obtained as shown in FIG. 4A (6).

(Preparation of Second Fiber Group-Containing Layer 105)

Preparation of Mixed Liquid B2

The materials for constituting the hydrogel material are formulated and dissolved by stirring under heating to give a mixed liquid B2. The heating temperature is not limited, and is preferably from 60 to 100° C. The heating/stirring time is not limited, and is preferably 1 hour or more, more preferably 3 hour or more as a rough standard. Where necessary, a colorant and the like are added, and the materials are stirred again to the extent that they are mixed.

Impregnation of Fibers

As shown in FIG. 4B (1), a front surface resin mold 205 for an organ and a back surface resin mold 206 for the organ for a second fiber group-containing layer, wherein the inner surfaces of the molds each has the shape of the organ and the molds are separated into two molds for a front surface and a back surface, are prepared. Since the back surface resin mold 206 for the organ is similar to the front surface resin mold 205 for the organ, it is not illustrated in some cases. As shown in FIG. 4B (2), the mixed liquid B2 is poured into these two front surface resin mold 205 and back surface resin mold 206 for the organ, respectively, and as shown in FIG. 4B (3), fiber groups 103 cut into the shape of the organ are put on each resin mold and impregnated with the mixed liquid B2.

Mold Clumping

Furthermore, as shown in FIG. 4B (4), the organ model A20 of only the first fiber group-containing layer is put on the liquid surface of the mixed liquid B2 of the front surface resin mold 205 for the second fiber group-containing layer, and as shown in FIG. 4B (5), the back surface resin mold 206 is joined with the front surface resin mold 205 with interposing the organ model A20 therebetween so that the liquid surfaces of the mixed liquid B2 are joined, and the molds are subjected to mold clumping.

Freezing

The joined resin molds are put into a freezer and left. The time for leaving is not limited, and is preferably 0.5 hour or more.

Molding

As shown in FIG. 4B (6), the resin mold for the second fiber group-containing layer is taken out of the freezer, the formed organ model B20 is released from the resin mold, and the shape is arranged by roughly trimming the outer periphery part.

Freezing

This organ model B20 is transferred to a tray, which is a metal container, and the metal container is put into a freezer and left. The freezing temperature is not limited, and is preferably −5° C. or less. The time for leaving is not limited, and is preferably 1 hour or more.

Opening

The tray is taken out of the freezer, and the outer periphery of the cured simulated organ is carefully trimmed so as not to break. At this time, an opening is formed according to the organ, and the film in the organ model B20 is withdrawn from the opening. As shown in FIG. 4C, the organ model B20 is transferred to the tray and immersed in, for example, water, and left, whereby an organ model 200 having the first fiber group-containing layer 104 and the second fiber group-containing layer 105 is completed. The temperature of the water and the leaving time are not limited, and are, for example, an ordinary temperature and a leaving time of 1 hour.

Second Exemplary Embodiment

<<Constitution of Organ Model of Second Exemplary Embodiment>>

Subsequently, the organ model of the second exemplary embodiment will be explained. In the second exemplary embodiment, since the constitution of the layer formed of a hydrogel material (a fiber group-containing layer) and the properties of the laminated body (the organ model and the like are similar to those of the first exemplary embodiment, the explanations are omitted.

In the organ model of this exemplary embodiment, the number of the fiber group-containing layers and the number of the layers enclosing fibers being a steric mesh-like structural body are not specifically limited, and there are cases depending on the purpose, i.e., the case where the laminated body has, as at least two fiber group-containing layers, a fiber group-containing layer enclosing a first fiber group and a fiber group-containing layer enclosing a second fiber group, or the laminated body has, as at least one fiber group-containing layer, a fiber group-containing layer enclosing at least a first fiber group and a second fiber group, and further has a layer enclosing fibers being a steric mesh-like structural body as a layer other than the fiber group-containing layer. In the following explanation, the case when two fiber group-containing layers are present is used as an example.

<Entire Constitution>

[Layer Enclosing Fibers being Steric Mesh-Like Structural Body]

The organ model of this exemplary embodiment in the case when the organ model further has a layer enclosing fibers being a steric mesh-like structural body is shown in FIG. 2. As shown in FIG. 2, the laminated body 100 includes the two fiber group-containing layers 106 and 108, and includes a layer enclosing fibers being a steric mesh-like structural body 110 under these fiber group-containing layers. Fibers 111 are enclosed fibers.

The purpose of the presence of the layer enclosing fibers being a steric mesh-like structural body is to exhibit softness while retaining inherent properties with enclosing the fibers.

Enclosed Fibers

The enclosed fibers differ depending on the purpose and are not limited, and examples include cotton, hemp, pelage and the like.

<<Use and Method for Using Organ Model of Second Exemplary Embodiment>>

In the organ model of this exemplary embodiment, the above-mentioned laminated body further has a layer enclosing fibers being a steric mesh-like structural body as a layer other than the fiber group-containing layer depending on the purpose. The use of this organ model is not limited, and is, for example, a skin, a glossopharyngeal part, a lung, a liver, a pancreas, a spleen, a kidney, a thyroid, a parathyroid, an adrenal gland, a membrane (for example, a peritoneum) or a prostate.

In the case when the organ model shown in FIG. 2 is an organ model of a skin, the fiber group-containing layer 106 is an epidermis layer, the fiber group-containing layer 108 is a dermis layer, and the layer containing fibers in a steric mesh-like structure 110 is a subcutaneous tissue layer. A skin is formed of four functional layers of an epidermis layer, a dermis layer, a subcutaneous tissue layer and a muscle layer, but some of the functional layers are sometimes omitted in an organ model depending on the site and purpose, and in the case when the organ model shown in FIG. 2 is an organ model of a skin, the muscle layer is omitted.

<<Method for Producing Organ Model of Second Exemplary Embodiment>>

Subsequently, the method for producing an organ model of this exemplary embodiment will be explained with exemplifying a method for producing a plate-like organ model (for example, an organ model of a skin). The production method of this exemplary embodiment is an example.

The organ model of the skin in this exemplary embodiment has a three-layer structure including a third layer 106 containing fiber groups, a second layer 108, which is a layer inside of the third layer 106 containing fiber groups, and a first layer 110, which is a layer further inside of the second layer 108 including fibers having a net-like steric structure. The first layer is an organ inside layer (for example, a subcutaneous tissue-simulated layer), the second layer is an organ intermediate layer (for example, a dermis-simulated layer), and the third layer is an organ outside layer (for example, an epidermis-simulated layer). As mentioned above, a skin is formed of four functional layers of an epidermis layer, a dermis layer, a subcutaneous tissue layer and a muscle layer, but some of the functional layers are sometimes omitted in an organ model depending on the site and purpose, and the muscle layer is omitted in the organ model of this exemplary embodiment.

(Preparation of Third Layer 106)
Preparation of Mixed Liquid
The materials for constituting the hydrogel material are formulated and dissolved by stirring under heating to give a mixed liquid A3. The heating temperature is not limited, and is preferably from 60 to 100° C. The heating/stirring time is not limited, and is preferably 1 hour or more, more preferably 3 hour or more as a rough standard. Where necessary, a colorant and the like are added, and the materials are stirred again to the extent that they are mixed.
Impregnation of Fibers
The mixed liquid A3 is poured into a mold 301 as shown in FIG. 8A (1) until the thickness becomes even (FIG. 8A (2)), and a fiber sheet 103 cut into the shape of the mold 301 is put thereon and impregnated with the mixed liquid A3 (FIG. 8A (3)).
Freezing
This mold 301 is put into a freezer and left to give a cured laminar substance A30 (FIG. 8A (4)). The freezing temperature is not limited, and is preferably −5° C. or less. In some cases, the temperature is gradually decreased. The time for leaving is not limited, and is preferably 0.5 hour or more.
(Preparation of First Layer 110)
Preparation of Mixed Liquid B3
The materials for constituting the hydrogel material are formulated and dissolved by stirring under heating to give a mixed liquid B3. The heating temperature is not limited, and is preferably from 60 to 100° C. The heating/stirring time is not limited, and is preferably 1 hour or more, more preferably 3 hour or more as a rough standard. Where necessary, a colorant and the like are added, and the materials are stirred again to the extent that they are mixed.
Impregnation of Fibers Having Net-Like Steric Structure
The mixed liquid B3 is poured into a mold 303 as shown in FIG. 8B (1) (FIG. 8B (2)), fibers having a net-like steric structure ill (for example, cotton) are put therein to allow the fibers to absorb the mixed liquid B3, and the fibers are spreaded with sleaving in the mold so that the thickness and density become even (FIG. 8B (3)).
Freezing
This mold 303 is put into a freezer and left. The freezing temperature is not limited, and is preferably −5° C. or less. In some cases, the temperature is gradually decreased. The time for leaving is not limited, and is preferably 0.5 hour or more.
(Preparation of Second Layer 108)
Preparation of Mixed Liquid C3
The materials for constituting the hydrogel material are formulated and dissolved by stirring under heating to give a mixed liquid C3. The heating temperature is not limited, and is preferably from 60 to 100° C. The heating/stirring time is not limited, and is preferably 1 hour or more, more preferably 3 hour or more as a rough standard. Where necessary, a colorant and the like are added, and the materials are stirred again to the extent that they are mixed.
Formation of Layers
The mixed liquid C3 is poured from above the mixed liquid B3 (the fibers having net-like steric structure 111), which has been already cured and then returned to an ordinary temperature, of the mold 303, until the thickness becomes even (FIG. 8B (4)), and a fiber group 103 cut into the shape of the tray is put thereon and impregnated with the mixed liquid C3. The mixed liquid C3 is further poured into the tray until the total thickness of the layers becomes a desired thickness and spreaded so as to have an even thickness (FIG. 8B (5)).

Bonding of Two Layers
The laminar substance A30 is bonded from above the liquid surface of the uncured mixed liquid C3 (FIGS. 8C (1) and 8C (2)).
Freezing
This mold 303 on which the three layers have been laminated is put into a freezer and left. The freezing temperature is not limited, and is preferably −5° C. or less. In some cases, the temperature is gradually decreased. The time for leaving is not limited, and is preferably 0.5 hour or more.
Molding
The mold is taken out of the refrigerator, and the laminate is taken out of the mold 303, immersed in pure water and left at an ordinary temperature for 1 hour. The outer periphery of the simulated organ is trimmed, whereby an organ model of this exemplary embodiment 300 having the third layer 106, the second layer 108 and the first layer 110 is completed (FIG. 8C (3)).

Third Exemplary Embodiment

<<Constitution of Organ Model of Third Exemplary Embodiment>>
Subsequently, the organ model of the third exemplary embodiment will be explained. In the third exemplary embodiment, since the constitution of the layer formed of a hydrogel material and the properties of the laminated body (organ model) and the like are similar to those of the first exemplary embodiment, the explanations are omitted.
The organ model of this exemplary embodiment may have only one of the above-mentioned fiber group-containing layer depending on the purpose. The organ model of this exemplary embodiment in this case is shown in FIG. 3. As shown in FIG. 3, in this exemplary embodiment, the fiber group-containing layer 104 and a fiber group-free layer 102 are present in the laminated body 100.
In the case when the organ model of the present invention has only one of the above-mentioned fiber group-containing layer, the organ model sometimes has a tubular shape when seen at a cross-sectional surface in the lamination direction. This is because the organ model imitates an organ having a tubular shape as a subject.
<<Use and Method for Use of Organ Model of Third Exemplary Embodiment>>
In the organ model of the present invention, the laminated body may have only one of the above-mentioned fiber group-containing layer depending on the purpose. The use of this organ model is not limited, and is, for example, an esophagus, a stomach, a small intestine, a large intestine, a biliary duct, a pancreatic duct, a urinary bladder, a urinary duct, a urethral tube, a vagina, an anus, a portal vein or a large blood vessel.
In the case when the organ model shown in FIG. 3 is a large intestine or a small intestine, the layer 102 is a muscle layer, and the fiber group-containing layer 104 is a mucous membrane layer. 101 is an interface between the layers.
<<Method for Producing Organ Model of Third Exemplary Embodiment>>
Subsequently, the method for producing the organ model of this exemplary embodiment will be explained, with exemplifying a method for producing an organ model having a tubular shape (for example, organ models of a small intestine and a large intestine).
The organ model of a large intestine of this exemplary embodiment is a hollow model, and has a ring-like two-layer structure having a first layer 104 including a fiber sheet disposed in a ring shape, and a second layer, which is a layer outside of the first layer 104. The first layer is an organ inside layer (for example, a mucous membrane-simulated layer), and the second layer is an organ outside layer (for example, a muscle-simulated layer).

(Preparation of First Layer 104)

Preparation of Mixed Liquid A4

The materials for constituting the hydrogel material are formulated and dissolved by stirring under heating to give a mixed liquid A4. The heating temperature is not limited, and is preferably from 60 to 100° C. The heating/stirring time is not limited, and is preferably 1 hour or more, more preferably 3 hour or more as a rough standard. Where necessary, a colorant and the like are added, and the materials are stirred again to the extent that they are mixed.

Disposition of Fibers (Winding)

A fiber sheet 103 of which shape has been arranged as necessary (for example, a strip-like nonwoven fabric) is helically wound around a rod 401 as a core as shown in FIG. 9A (1) (FIG. 9A (2)). At this time, the shape of the rod 401 is not limited and may be suitably modified in accordance with the model formed, and the material thereof is also not limited at all. Furthermore, the method for disposing the fiber sheet 103 on the rod is also not limited at all, and it is sufficient that the fiber sheet 103 is approximately fixed to the extent that the fiber sheet 103 does not fall from the rod 401 in each process. For example, the fiber sheet 103 may be temporarily fixed on the rod 401 by using a tape or the like, or the fiber sheet 103 having a tubular shape may be disposed so as to cover the rod 401.

Impregnation of Fibers

Subsequently, a mold for forming a first layer (a tray) is prepared (FIG. 9A (3)). In this exemplary embodiment, the mold for forming a first layer is a mold having a structure that is divided into two molds that are symmetric up and down, a bottom surface mold 403 and a top surface mold 404, in which a rod 401 to be a core can be positioned on the center of the mold at the both ends (hereinafter the top surface mold 404 will be omitted in some cases). Subsequently, the mixed liquid A4 is poured into these two molds (the bottom surface mold 403 and the top surface mold 404), respectively (FIG. 9A (4)).

Mold Clumping

The rod 401 on which the fiber sheet 103 has been disposed is set into the bottom surface mold 403 into which the mixed liquid A4 has been poured (FIG. 9A (5)), and the bottom surface mold 403 and the top surface mold 404 are mated and subjected to mold clumping (FIG. 9A (6)).

Freezing

The mold for forming a first layer (the bottom surface mold 403 and the top surface mold 404) enclosing the mixed liquid A4 and the rod 401 on which the fiber sheet 103 has been disposed is put into a freezer and left. The freezing temperature is not limited, and is preferably −5° C. or less. In some cases, the temperature is gradually decreased. The time for leaving is not limited, and is, for example, preferably 0.5 hour or more.

Molding

The content in which the mixed liquid A4 has been solidified and which has been integrated with the fiber sheet 103 (an imitated organ A40) is taken out of the mold for forming a first layer (FIG. 9A (7)). At this time, trimming of the burr parts on the mated surface between the bottom surface mold 403 and the top surface mold 404, trimming of the excess parts (the both ends of in the longitudinal direction of the simulated organ) or the like may also be conducted, in accordance with the mold for forming a second layer mentioned below.

(Preparation of Second Layer 102)

Preparation of Mixed Liquid B4

The materials for constituting the hydrogel material are formulated and dissolved by stirring under heating to give a mixed liquid B4. The heating temperature is not limited, and is preferably from 60 to 100° C. The heating/stirring time is not limited, and is preferably 1 hour or more, more preferably 3 hour or more as a rough standard. Where necessary, a colorant and the like are added, and the materials are stirred again to the extent that they are mixed.

Lamination of Second Layer

Subsequently, the mold for forming a second layer (a tray) is prepared (FIG. 9B (1)). In this exemplary embodiment, the mold for forming a second layer is a mold having a structure that is divided into two molds that are symmetric up and down, a top surface resin mold 408 and a bottom surface resin mold 407, in which a resin rod to be a core can be positioned on the center of the mold at the both ends (hereinafter the top surface mold 408 will be omitted in some cases). Secondly, the mixed liquid B4 is poured into these two molds (the bottom surface mold 407 and the top surface mold 408), respectively (FIG. 9B (2)).

Mold Clumping

A simulated organ A40 (the resin rod 401 on which the cured mixed liquid A4 has been approximately fixed as a first layer) is set in the mold for forming a second layer (the bottom surface mold 407) into which the mixed liquid B4 has been poured ((FIG. 9B (3))), and the molds for forming a second layer (the bottom surface mold 407 and the top surface mold 408) are mated and subjected to mold clumping (FIG. 9B (4)).

Freezing

The molds for molding a second layer (the bottom surface mold 407 and the top surface mold 408) enclosing the mixed liquid B4, the cured mixed liquid A4, and the rod 401 on which the fiber sheet 103 has been disposed is put into a freezer and left. The freezing temperature is not limited, and is preferably −5° C. or less. In some cases, the temperature is gradually decreased. The time for leaving is not limited, and is, for example, preferably 0.5 hour or more.

Molding

The content in a state that the cured mixed liquid B4 has been integrated so as to cover the outer periphery of the cured mixed liquid A4 (a simulated organ B40) is taken out of the mold for forming a second layer (FIG. 9B (5)). At this time, trimming of the burr parts on the mated surface between the bottom surface mold 407 and the top surface mold 408, or the like may also be conducted.

Freezing

This simulated organ B40 may further be frozen (for example, it is preferable to leave in a freezer at −5° C. or less for 10 hours or more). Thereafter, after taking out of the freezer, the simulated organ may be suitably left at an ordinary temperature (for example, 5 minutes).

Molding

The resin rod 401 is withdrawn from the simulated organ B40 (FIG. 9B (6)), whereby an organ model 400 is completed (FIG. 9C). In addition, the both ends of the organ model 400 may be cut in accordance with a desired shape. Furthermore, it is preferable that the completed organ model 400 is suitably immersed in water (for example, pure water).

EXAMPLES

Subsequently, the present invention will further be specifically explained by Examples and Comparative Examples, but the present invention is not construed to be limited at all by these examples.

EXAMPLES

Example 1: Preparation of Stomach Model

The method for preparing the organ model of stomach 200 of Example 1 will be explained with referring to FIG. 4. The organ model of stomach 200 of Example 1 is a bag-like model having a space inside, and has a two-layer structure of muscle-simulated layer 105 including a fiber sheet, and a mucous membrane-simulated organ (a mucous membrane-simulated layer 104), which is a layer inside of the muscle-simulated layer and includes a fiber sheet.

(Preparation of Mucous Membrane-Simulated Layer)

Preparation of Mixed Liquid for Mucous Membrane

A solution formed by mixing a polyvinyl alcohol (saponification degree: 99%), dimethylsulfoxide and pure water was put into a beaker and formulated, and dissolved by stirring for 4 hours while the beaker was heated to 100° C. by a mantle heater (manufactured by AS-1, type: HB-2000T) to give a mixed liquid. A pink aqueous colorant was added at a ratio of 3.9 g per 130 g of the mixed liquid, and the mixture was mixed in a stirring machine (manufactured by Thinky, type: AR-250) for 40 seconds to give a mixed liquid A2 for a mucous membrane.

Impregnation of Fibers

A resin mold for molding a mucous membrane having an inner surface having a stomach shape in the mold (a resin mold 201 for a front surface of a stomach and a resin mold 202 for a back surface of a stomach for molding a mucous membrane, which are divided into two surfaces of a front surface and a back surface) was prepared (FIG. 4A (1)). Since the resin mold 202 for a back surface of a stomach is similar to the resin mold 201 for a front surface of a stomach, it is not illustrated in some cases. Each of the resin molds has a mold depth, which becomes the thickness direction of a tissue, of 1 mm for both resin molds. The mixed liquid A2 for a mucous membrane was poured into the two molds, the resin mold 201 for a front surface and the resin mold 202 for a back surface of a stomach for molding a mucous membrane, respectively (FIG. 4A (2)). A nonwoven fabric 103 cut into the shape of the stomach was put on each resin mold, and impregnated with the mixed liquid A2 for a mucous membrane (FIG. 4A (3)).

Mold Clumping

A polyethylene film 208 (type: Unipack J-4, manufactured by Seisannipponsha Ltd.) cut into the shape of the stomach was put on the resin mold 201 for a front surface of a stomach for molding a mucous membrane so as not to enclose air (FIG. 4A (4)). Furthermore, the resin mold 201 for a front surface of a stomach was joined with the resin mold 202 for a back surface of a stomach so that the liquid surfaces of the mixed liquid A2 for a mucous membrane were joined, and the resin molds were subjected to mold clumping (FIG. 4A (5)).

Freezing

The joined resin molds for molding a mucous membrane were put into a freezer at a freezer inner temperature of −20° C., and left for 4 hours.

Molding

The resin molds for molding a mucous membrane were taken out of the freezer, and the molded simulated organ of only a mucous membrane was released from the resin molds for molding a mucous membrane, and the shape was arranged by trimming the outer periphery part to give the mucous membrane-simulated organ A20 (FIG. 4A (6)).

(Preparation of Muscle-Simulated Layer)

Preparation of Mixed Liquid for Muscle

A solution formed by mixing a polyvinyl alcohol (saponification degree: 99%), dimethylsulfoxide and pure water was put into a beaker and formulated, and the solution was dissolved by stirring for 4 hours with heating the beaker in a mantle heater (type: HB-2000T, manufactured by AS-1) to 100° C. to give a mixed liquid. A pale orange aqueous colorant was added at a ratio of 5.4 g per 180 g of the mixed liquid, and the mixture was mixed by a stirring machine (manufactured by Thinky, type: AR-250) for 40 seconds to give a mixed liquid B2 for a muscle.

Impregnation of Fibers

A resin mold for molding a muscle having an inner surface having a stomach shape in the mold (a resin mold 205 for a front surface of a stomach and a resin mold 206 for a back surface of a stomach for molding a muscle, which are divided into two surfaces of a front surface and a back surface) was prepared (FIG. 4B (1)). Since the resin mold 206 for a back surface of a stomach is similar to the resin mold 205 for a front surface of a stomach, it is not illustrated in some cases. Each of the resin molds has a mold depth, which becomes the thickness direction of a tissue, of 2.5 mm for both resin molds. The mixed liquid B2 for a muscle was poured into these two molds, the resin mold 205 for a front surface and the resin mold 206 for a back surface of a stomach for molding a muscle (FIG. 4B (2)), and a nonwoven fabric 103 cut into the shape of the stomach was put on each resin mold, and impregnated with the mixed liquid B2 for a muscle (FIG. 4B (3)).

Mold Clumping

Furthermore, the simulated organ A20 of only a mucous membrane was put on the liquid surface of the mixed liquid B2 for a muscle in the resin mold 205 for a front surface of a stomach for molding a muscle (FIG. 4B (4)), and the resin mold 206 for a back surface of a stomach is joined with the resin mold 205 for a front surface of a stomach for molding a muscle so that the liquid surfaces of the mixed liquid B2 for a muscle were joined with interposing the simulated organ therein, and the resin molds were subjected to mold clumping (FIG. 4B (5)).

Freezing

The resin molds for molding a muscle were put into a freezer at a freezer inner temperature of −20° C., and left for 12 hours.

Molding

The resin molds for molding a muscle were taken out of the freezer, and the molded simulated organ B1 was released from the resin mold for molding a muscle, and the shape was arranged by trimming the outer periphery part (FIG. 4B (6)).

Freezing

This simulated organ was transferred to a tray, which is a metal container, put into a freezer at a freezer inner temperature of −20° C., and left for 10 hours.

Opening

The tray was taken out of the freezer, and the outer periphery of the cured simulated organ was carefully trimmed so as not to break the simulated organ. At this time, only the outer periphery parts of the part running into an esophagus and the part running into intestines were trimmed at the parts slightly close to the center of the organ to make openings, and the polyethylene film inside of the simulated organ was withdrawn from the openings. The simulated organ was transferred to the tray, immersed in pure water and left at an ordinary temperature for 1 hour, whereby the organ model of stomach 200 of Example 1 was completed (FIG. 4C). A photograph is shown in FIG. 10.

Example 2: Preparation of Skin Model

Secondly, the method for preparing the organ model 300 of a skin of Example 2 will be explained. The organ model of a skin of Example 2 has a three-layer structure having an epidermis-simulated layer 106 including a fiber sheet, a dermis-simulated layer 108, which is a layer under the epidermis-simulated layer 106 and includes a fiber sheet, and a subcutaneous tissue-simulated layer 110, which is a layer under the dermis-simulated layer 108 and includes cotton as fibers being a steric mesh-like structural body. As mentioned above, a skin is formed of four functional layers of an epidermis layer, a dermis layer, a subcutaneous tissue layer and a muscle layer, but a part of the functional layers is sometimes omitted in an organ model depending on the site and purpose, and the muscle layer is omitted in the organ model of Example 2.

(Preparation of Epidermis-Simulated Layer 106)
Preparation of Mixed Liquid for Epidermis A solution formed by mixing a polyvinyl alcohol (saponification degree: 99%), dimethylsulfoxide and pure water was put into a beaker and formulated, and dissolved by stirring for 4 hours while the beaker was heated to 100° C. by a mantle heater to give a mixed liquid. An aqueous pale orange colorant was added at a ratio of 0.3 g per 100 g of the mixed liquid, and the mixture was mixed in a stirring machine for 40 seconds to give a mixed liquid A3 for an epidermis.

Impregnation of Fibers

The mixed liquid A3 for an epidermis was poured into a tray 301 for curing an epidermis, which is a metal container, until the thickness became an even thickness of 1.5 mm (FIG. 8A (2)), and a nonwoven fabric 103 cut into the shape of the tray was put thereon and impregnated with the mixed liquid A3 for an epidermis (FIG. 8A (3)).

Freezing

The tray 301 for curing an epidermis was put into a freezer at a freezer inner temperature of −20° C., and left for 0.5 hours. Thereafter the tray 301 was taken out of the freezer and left to an ordinary temperature, and a laminar substance A30 for an epidermis (an epidermis-simulated layer) was taken out of the tray 301 for curing an epidermis (FIG. 8A (4)).

(Preparation of Subcutaneous Tissue-Simulated Layer 110)
Preparation of Mixed Liquid for Subcutaneous Tissue A polyvinyl alcohol (saponification degree: 99%) and pure water were put into a beaker and formulated, and dissolved by stirring for 4 hours while the beaker was heated to 100° C. by a mantle heater to give a mixed liquid. An aqueous pink colorant was added at a ratio of 7.5 g per 250 g of the mixed liquid, and the mixture was mixed in a stirring machine for 40 seconds to give a mixed liquid B3 for a subcutaneous tissue.

Impregnation of Fibers

The mixed liquid B3 for a subcutaneous tissue was poured to a thickness of 13 mm into a tray 303 for curing a subcutaneous tissue, which is a metal container (FIG. 8B (2)), 12 g of cotton fibers were put therein to allow the cotton fibers to absorb water until the cotton fibers were saturated with the mixed liquid B3 for a subcutaneous tissue, and the fibers were spreaded with sleaving in the tray 303 so that the thickness and density become even (FIG. 8B (3)).

Freezing

This tray 303 for curing a subcutaneous tissue was put into a freezer at a freezer inner temperature of −20° C. and left for 2 hours. Thereafter the tray 303 was taken out of the freezer and left to an ordinary temperature.

(Preparation of Dermis-Simulated Layer 108)
Preparation of Mixed Liquid for Dermis A solution formed by mixing a polyvinyl alcohol (saponification degree: 99%), dimethylsulfoxide and pure water was put into a beaker and formulated, and dissolved by stirring for 4 hours while the beaker was heated to 100° C. by a mantle heater to give a mixed liquid. An aqueous white colorant was added at a ratio of 4.5 g per 150 g of the mixed liquid, and the mixture was mixed in a stirring machine for 40 seconds to give a mixed liquid C3 for a dermis.

Formation of Layer

The mixed liquid C3 for a dermis was poured from above the mixed liquid B3 for a subcutaneous tissue, which had been already returned to an ordinary temperature after the curing, of the tray 303 for a subcutaneous tissue, until the thickness became an even thickness of 1 mm (FIG. 8B (4)), and a nonwoven fabric cut into the shape of the tray 303 was put thereon and impregnated with the mixed liquid C3 for a dermis. Furthermore, the mixed liquid C3 for a dermis was poured until the total thickness of the layers became 16 mm and spreaded until the thickness became even (FIG. 8B (5)).

Bonding of Two Layers

The laminar substance A30 (an epidermis-simulated layer) was carefully bonded from above the liquid surface of the already uncured mixed liquid C3 for a dermis, of the tray 303 for a subcutaneous tissue from the front side to the back so as not to enclose air.

Freezing

The tray 303 containing the simulated skin in which the three layers had been laminated was put into a freezer at a freezer inner temperature of −20° C. and left for 24 hours.

Molding

The tray 303 was taken out of the refrigerator, and the simulated skin was taken out of the tray 303, immersed in pure water and left at an ordinary temperature for 1 hour. The outer periphery was trimmed, whereby a simulated model 300 of a skin of Example 2 was completed. A photograph is shown in FIG. 11.

Example 3: Preparation of Large Intestine Model

Subsequently, the method for preparing the organ model 400 of a large intestine of Example 3 will be explained. The organ model of a large intestine of Example 3 is a hollow model, and has a ring-shaped two-layer structure having a mucous membrane-simulated layer 104 including a fiber sheet disposed in a ring shape and a muscle-simulated layer 102, which is an outer layer of the mucous membrane-simulated layer 104.

(Preparation of Mucous Membrane-Simulated Layer 104)
Preparation of Mixed Liquid for Mucous Membrane A4

A solution formed by mixing a polyvinyl alcohol (saponification degree: 99%), dimethylsulfoxide and pure water was put into a beaker and formulated, and dissolved by stirring for 4 hours while the beaker was heated to 100° C. by a mantle heater to give a mixed liquid. An aqueous pink colorant was added at a ratio of 6.6 g per 220 g of the mixed liquid, and the mixture was mixed by a stirring machine for 40 seconds to give a mixed liquid A4 for a mucous membrane.

Disposition of Fibers (Winding)

A nonwoven fabric 103 cut into a strip shape was wound in a helical shape around a resin rod 401 having a diameter of 31 mm and a length of 300 mm as a core as shown in FIG. 9A (1) (FIG. 9A (2)). At this time, the nonwoven fabric was wound so as to sufficiently cover the resin rod to the extent that the nonwoven fabric did not protrude from the resin rod.

Impregnation of Fibers

A resin mold for molding a mucous membrane with an internal surface of the mold having a shape of a large intestine (having a structure divided into two molds of a top surface resin mold 404 and a bottom surface resin mold 403, in which a resin rod to be a core can be positioned on the center of the mold at the both ends) was prepared (FIG. 9A (3)). The respective resin molds for molding a mucous membrane (the top surface resin mold 404 and the bottom surface resin mold 403) are symmetric up and down, and the inner diameter of the molds during mating is 32 mm (in some cases, the resin molds are simply referred to as the resin mold for molding a mucous membrane or the like, without distinguishing the top surface resin mold and the bottom surface resin mold). The mixed liquid for a mucous membrane A4 was poured into these two resin molds for molding a mucous membrane, respectively (FIG. 9A (4)).

Mold Clumping

A resin rod around which a nonwoven fabric had been wound was set into a resin mold 403 for molding a mucous membrane, into which the mixed liquid A4 for a mucous membrane had been poured (FIG. 9A (5)), and the resin molds 403 and 404 for molding a mucous membrane were quickly mated and subjected to mold clumping (FIG. 9A (6)).

Freezing

The resin molds for molding a mucous membrane were put into a freezer at a freezer inner temperature of −20° C. and left for 4 hours. Thereafter the resin mold was taken out of the freezer, and left to an ordinary temperature.

Molding

A simulated organ A40 of only a mucous membrane was taken out of the resin molds for molding a mucous membrane (FIG. 9A (7)), and the burr on the mated surface of the resin molds and the both ends at 5 mm in the longitudinal direction of the simulated organ were trimmed under a state that the simulated organ was attached to the resin rod 401.

(Preparation of Muscle-Simulated Layer 102)

Preparation of Mixed Liquid B4 for Muscle

A solution formed by mixing a polyvinyl alcohol (saponification degree: 99%), dimethylsulfoxide and pure water was put into a beaker and formulated, and dissolved by stirring for 4 hours while the beaker was heated to 100° C. by a mantle heater to give a mixed liquid. A pale orange aqueous colorant was added at a ratio of 6.6 g per 220 g of the mixed liquid, and the mixture was mixed in a stirring machine for 40 seconds to give a mixed liquid B4 for a muscle.

Lamination of Muscle-Simulated Layer

A resin mold for molding a mucous membrane with an internal surface of the mold having a shape of a large intestine (having a structure that is divided into two molds of a top surface resin mold 408 and a bottom surface resin mold 407, in which a resin rod to be a core can be positioned on the center of the mold at the both ends) was prepared (FIG. 9B (1)). The respective resin molds for molding a muscle are symmetric up and down, and the inner diameter of the molds during mating is 33 mm (in some cases, the resin molds are simply referred to as a resin mold for molding a muscle or the like, without distinguishing the top surface resin mold and the bottom surface resin mold)). The mixed liquid B4 for a muscle was poured into each of these two resin molds for molding a muscle (FIG. 9B (2)).

Mold Clumping

A simulated organ A40 (a resin rod 401 on which a mucous membrane layer had been already formed) was set into the resin mold 407 for molding a muscle into which the mixed liquid B4 for a muscle had been poured ((FIG. 9B (3)), and the resin molds 407 and 408 for molding a muscle were quickly mated and subjected to mold clumping (FIG. 9B (4)).

Freezing

These resin molds for molding a mucous membrane were put into a freezer at a freezer inner temperature of −20° C. and left for 12 hours. Thereafter the resin molds were taken out of the freezer, and left to an ordinary temperature.

Molding

The large intestine-simulated organ B40 was taken out of the resin molds for molding a muscle (FIG. 9B (5)), and the burr on the mated surface of the resin molds was trimmed in the state that the simulated organ was attached to the resin rod 401.

Freezing

These resin rod was put into a freezer at a freezer inner temperature of −20° C. and left for 10 hours. Thereafter the resin rod was taken out of the freezer, and left at an ordinary temperature for 5 minutes.

Molding

The large intestine-simulated organ B40 is withdrawn from the resin rod (FIG. 9B (6)), and the both end parts are cut with leaving 200 mm of the central part. The simulated organ was immersed in pure water and left for 1 hour at an ordinary temperature, whereby an organ model 400 of large intestine of Example was completed (FIG. 9C). A photograph is shown in FIG. 12.

COMPARATIVE EXAMPLES

Comparative Examples 1 to 3

Organ models of a stomach, a skin and a large intestine having no fiber group-containing layer were prepared by mixing similar materials and by similar methods to those of Examples 1 to 3, except that the nonwoven fabric 103 was not incorporated, and were set as Comparative Examples 1 to 3.

Reference Examples 1 to 3

A stomach, a skin and a large intestine of a pig were set as Reference Examples 1 to 3.

<<Measurements>>

The respective measurements were conducted on Examples, Comparative Examples and Reference Examples according to the above-mentioned measurement methods. The results of the measurements are shown in FIGS. 13 to 15.

(Peeling-Off Load Test)

According to the above-mentioned method, peeling-off load tests were conducted on Examples, Comparative Examples and Reference Examples. However, a peeling-off test was not conducted on the organ model of a large intestine of Example 3, since the layers are not peeled off in an actual operation of a large intestine. However, since the organ model has the same structure even it has a tubular shape, it is possible to impart a peeling-off property. FIG. 13 shows the changes in strength in Examples, Comparative Examples and Reference Examples. Table 1 shows the sensory evaluations of Examples and Comparative Examples. The criteria for sensory evaluation are A: fine, B:

slightly not enough, C: not suitable for use in training, D: evaluation is impossible, in comparison with a real organ. A photograph of the organ model of a skin of Example 2 after the sensory evaluation is shown in FIG. 16.

[Table 1]

When FIG. 13 is seen, it is found that peeling off was possible in Examples 1 and 2, and these changes in strength are similar to those of the stomach and skin of a pig in Reference Examples 1 and 2. Furthermore, the sensory evaluation is A in either example, and thus the sense of peeling is very close to that of a real organ.

As shown in FIG. 13, it was originally impossible to peel off the layers in the respective Comparative Examples with no nonwoven fabric. This is because the fiber group-containing erence Examples. Table 1 shows the sensory evaluations in Examples and Comparative Examples. The criteria for the sensory evaluation are A: fine, B: slightly not enough, C: not suitable for use in training, D: evaluation is impossible, in comparison with a real organ.

When FIG. 15A is seen, it is understood that the strength in Comparative Example 1 is low, whereas the strength in Example 1 is high and this strength is not different from the strength of the pig stomach in Reference Example 1. The same also applies to Example 2 shown in FIG. 15B and Example 3 shown in FIG. 15C. Furthermore, the sensory evaluation is A in either example. From these facts, the property such that ligation can be performed without burying of a suture thread, the property such that a knot of the

TABLE 1

| | Simulated organ as subject | | | | | |
|---|---|---|---|---|---|---|
| | Stomach | | Skin | | Large intestine | |
| | Example 1 With fibers | Comparative Example 1 Without fibers | Example 2 With fibers | Comparative Example 2 Without fibers | Example 3 With fibers | Comparative Example 3 Without fibers |
| Sense of peeling of layers | A | D | A | D | — | — |
| Sense of stinging and cut-open with surgical knife | A | C | A | C | A | B |
| Sense of passing of thread through organ and possibly of ligation | A | C | A | C | A | C | layer is absent.

(Surgical Knife-Sting Load Test)

According to the above-mentioned method, surgical knife-sting load tests in peeling off in Examples, Comparative Examples and Reference Examples were conducted. FIG. 14 shows the changes in strength in Examples, Comparative Examples and Reference Examples. Table 1 shows the sensory evaluations of Examples and Comparative Examples. The criteria for the sensory evaluation are A: fine, B: slightly not enough, C: not suitable for use in training, D: evaluation is impossible, in comparison with a real organ.

When FIG. 14A is seen, no peak is seen in the shape of the waveform of Comparative Example 1 unlike Reference Example 1, whereas it can be said that the shape of the waveform of Example 1 is close to the shape of the waveform of Reference Example 1. The same also applies to FIG. 14B and FIG. 14C. Furthermore, when FIG. 14A is seen, it can be understood that the strength of Comparative Example 1 is low, whereas the strength of Example 1 is high, and this strength is not different from the strength of the pig stomach of Reference Example 1. The same also applies to Example 2 shown in FIG. 14B. Furthermore, the sensory evaluation was A in either example. From these facts, the sense of elasticity that is felt when a surgical knife cuts the organ model open, sliding and a sense of catching are considerably close to those of real organ models in either of the organ models of Examples 1 to 3.

(Thread-Tearing Test)

According to the above-mentioned method, thread-tearing tests on Examples, Comparative Examples and Reference Examples were conducted. FIG. 15 shows the changes in strength in Examples, Comparative Examples and Refthread gets caught, and the like are considerably close to those of real organs in either of the organ models of Examples 1 to 3.

REFERENCE SIGNS LIST

100 laminated body
101 interface
102 fiber group-free layer
103 fiber group
104, 105, 106, 108 fiber group-containing layer
110 layer containing fibers in steric mesh-like structure
111 fibers in steric mesh-like structure
200 organ model of first exemplary embodiment, organ model of stomach
A2 mixed liquid, mixed liquid for mucous membrane
A20 organ model of only first fiber group-containing layer, mucous membrane-simulated organ
B2 mixed liquid, mixed liquid for muscle
B20 organ model
201 front surface resin mold of organ for first fiber group-containing layer, front surface resin mold of stomach for molding mucous membrane
202 back surface resin mold of organ for first fiber group-containing layer, back surface resin mold of stomach for molding mucous membrane
205 front surface resin mold of organ for second fiber group-containing layer, front surface resin mold of stomach for molding muscle
206 back surface resin mold of organ for second fiber group-containing layer, back surface resin mold of stomach for molding muscle 208 film
300 organ model of second exemplary embodiment, organ model of skin
A3 mixed liquid, mixed liquid for epidermis
A30 laminar substance, laminar substance for epidermis
B3 mixed liquid, mixed liquid for subcutaneous tissue
C3 mixed liquid, mixed liquid for dermis
301 resin mold of organ for third layer, tray for curing epidermis
303 resin mold of organ for second exemplary embodiment, tray for subcutaneous tissue
400 organ model of third exemplary embodiment, organ model of large intestine
A4 mixed liquid, mixed liquid for mucous membrane
A40 simulated organ, simulated organ of only mucous membrane
B4 mixed liquid, mixed liquid for muscle
B40 simulated organ, large intestine-simulated organ
401 rod for third exemplary embodiment, rod or organ model of large intestine
403 bottom surface mold for forming first layer, bottom surface resin mold for molding mucous membrane
404 top surface mold for forming first layer, top surface resin mold for molding mucous membrane
407 bottom surface mold for forming second layer, bottom surface resin mold for molding muscle
408 top surface mold for forming second layer, top surface resin mold for molding muscle

The invention claimed is:

1. An organ model being a laminated body,
wherein the laminated body comprises plural layers that are laminated and each formed of a hydrogel material,
wherein one or more of the layers is each a fiber group-containing layer in which fiber groups (except for fibrous structures made of collagen) are approximately continuously present inside the layer and over the plane of the layer, and
wherein a layer that is adjacent to the fiber group-containing layer is capable of being peeled off in the vicinity of an interface between the fiber group-containing layer and the adjacent layer.

2. The organ model according to claim 1, wherein the strength of the peeling off is from 0.1 to 50 N/cm.

3. The organ model according to claim 2, wherein the laminated body further comprises a layer enclosing fibers, wherein the fibers have a three-dimensional mesh structure.

4. The organ model according to claim 3, wherein the organ is a skin, a glossopharyngeal part, a lung, a liver, a pancreas, a spleen, a kidney, a thyroid, a parathyroid, an adrenal gland, a peritoneum or a prostate.

5. The organ model according claim 1, wherein
the one or more of the layers comprise: a fiber group-containing layer enclosing a first fiber group; and a fiber group-containing layer enclosing a second fiber group, or
the one or more of the layers comprise a fiber group-containing layer enclosing at least the first fiber group and the second fiber group.

6. The organ model according to claim 5, wherein the first fiber group and the second fiber group are capable of being peeled off.

7. The organ model according to claim 5, wherein the organ is a heart, a chest wall, an abdominal wall, a diaphragm, a gallbladder, a stomach, a urinary bladder, a peritoneum or a skin.

8. The organ model according to claim 1, wherein the laminated body has only one of the fiber group-containing layers.

9. The organ model according to claim 8, wherein the laminated body has a tubular shape when the laminated body is seen from a cross-sectional surface in the lamination direction.

10. The organ model according to claim 8, wherein the organ is an esophagus, a stomach, a small intestine, a large intestine, a biliary duct, a pancreatic duct, a urinary bladder, a urinary duct, a urethral tube, a vagina, an anus, a portal vein or a large blood vessel.

11. The organ model according to claim 1, wherein the fiber group is a fiber sheet.

12. The organ model according to claim 1, wherein the hydrogel material contains a polyvinyl alcohol.

13. The organ model according to claim 1, wherein at least one of the layers each formed of a hydrogel material is a first colored layer having a certain color, and at least one of the layers that are different from the first colored layer is a second colored layer having a different color from the certain color.

14. An organ model being a laminated body,
wherein the laminated body comprises plural layers that are laminated and each formed of a hydrogel material,
wherein one or more of the layers is each a fiber group-containing layer in which fiber groups are approximately continuously present inside the layer and over the plane of the layer,
wherein a layer that is adjacent to the fiber group-containing layer is capable of being peeled off in the vicinity of an interface between the fiber group-containing layer and the adjacent layer, and
wherein the laminated body further comprises a layer enclosing fibers, wherein the fibers have a three-dimensional mesh structure.

15. The organ model according to claim 14, wherein the strength of the peeling off is from 0.1 to 50 N/cm.

16. The organ model according to claim 14, wherein the organ is a skin, a glossopharyngeal part, a lung, a liver, a pancreas, a spleen, a kidney, a thyroid, a parathyroid, an adrenal gland, a peritoneum or a prostate.

17. The organ model according to claim 14, wherein the hydrogel material contains a polyvinyl alcohol.

18. The organ model according to claim 14, wherein the fiber group is a fiber sheet.

19. The organ model according to claim 14, wherein at least one of the layers each formed of a hydrogel material is a first colored layer having a certain color, and at least one of the layers that are different from the first colored layer is a second colored layer having a different color from the certain color.

20. An organ model being a laminated body,
wherein the laminated body comprises plural layers that are laminated and each formed of a hydrogel material,
wherein one or more of the layers is each a fiber group-containing layer in which fiber groups are approximately continuously present inside the layer and over the plane of the layer, and
wherein the one or more of the layers comprise: a fiber group-containing layer enclosing a first fiber group; and a fiber group-containing layer enclosing a second fiber group, or
the one or more of the layers comprise a fiber group-containing layer enclosing at least the first fiber group and the second fiber group, and wherein the first fiber group and the second fiber group are capable of being peeled off.

21. The organ model according to claim 20, wherein the organ is a heart, a chest wall, an abdominal wall, a diaphragm, a gallbladder, a stomach, a urinary bladder, a peritoneum or a skin.

22. An organ model being a laminated body,
wherein the laminated body comprises plural layers that are laminated and each formed of a hydrogel material,
wherein one or more of the layers is each a fiber group-containing layer in which fiber groups are approximately continuously present inside the layer and over the plane of the layer, and
wherein the laminated body has only one of the fiber group-containing layers, and has a tubular shape when the laminated body is seen from a cross-sectional surface in the lamination direction, and
wherein a layer that is adjacent to the fiber group-containing layer is capable of being peeled off in the vicinity of an interface between the fiber group-containing layer and the adjacent layer.

23. The organ model according to claim 22, wherein the strength of the peeling off is from 0.1 to 50 N/cm.

24. The organ model according to claim 22, wherein the organ is an esophagus, a stomach, a small intestine, a large intestine, a biliary duct, a pancreatic duct, a urinary bladder, a urinary duct, a urethral tube, a vagina, an anus, a portal vein or a large blood vessel.

25. An organ model being a laminated body,
wherein the laminated body comprises plural layers that are laminated and each formed of a hydrogel material,
wherein one or more of the layers is each a fiber group-containing layer in which fiber groups are approximately continuously present inside the layer and over the plane of the layer,
wherein the hydrogel material contains a polyvinyl alcohol, and
wherein a layer that is adjacent to the fiber group-containing layer is capable of being peeled off in the vicinity of an interface between the fiber group-containing layer and the adjacent layer.

26. The organ model according to claim 25, wherein the strength of the peeling off is from 0.1 to 50 N/cm.

* * * * *